(12) United States Patent
Hong et al.

(10) Patent No.: US 12,525,846 B2
(45) Date of Patent: Jan. 13, 2026

(54) MOTOR ASSEMBLY

(71) Applicant: LG Electronics Inc., Seoul (KR)

(72) Inventors: Jin Hong, Seoul (KR); Kwangyong Jang, Seoul (KR); Yongdae Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 221 days.

(21) Appl. No.: 18/276,841

(22) PCT Filed: Jan. 11, 2022

(86) PCT No.: PCT/KR2022/000459
§ 371 (c)(1),
(2) Date: Aug. 10, 2023

(87) PCT Pub. No.: WO2022/173134
PCT Pub. Date: Aug. 18, 2022

(65) Prior Publication Data
US 2024/0106296 A1 Mar. 28, 2024

(30) Foreign Application Priority Data
Feb. 10, 2021 (KR) .................. 10-2021-0019423

(51) Int. Cl.
*H02K 5/22* (2006.01)
*H02K 3/34* (2006.01)
(Continued)

(52) U.S. Cl.
CPC ............. *H02K 5/225* (2013.01); *H02K 3/345* (2013.01); *H02K 9/06* (2013.01); *H02K 3/522* (2013.01); *H02K 2203/09* (2013.01)

(58) Field of Classification Search
CPC ........ H02K 5/225; H02K 3/522; H02K 1/148; H02K 9/06; H02K 2211/03;
(Continued)

(56) References Cited

U.S. PATENT DOCUMENTS

2015/0137637 A1* 5/2015 Jang .................. H02K 15/33
29/598
2016/0218578 A1 7/2016 Yamada et al.
(Continued)

FOREIGN PATENT DOCUMENTS

EP 3771074 A1 1/2021
JP 2014-165999 9/2014
(Continued)

OTHER PUBLICATIONS

Stafford et al., Brushless Motor, 2020-09-25, KR 20200110809 (English Machine Translation) (Year: 2020).*
(Continued)

*Primary Examiner* — Alexander A Singh
(74) *Attorney, Agent, or Firm* — Fish & Richardson P.C.

(57) ABSTRACT

A motor assembly includes a stator including a stator core having teeth, a stator coil having phase coils wound on the teeth, respectively, and an insulator interposed between the stator core and the stator coil for insulation of the stator coil, and a rotor which has a rotation shaft and is spaced apart from the stator with a space therebetween and is rotatably disposed. Each power line of the phase coils extends to one end of the stator core along the axial direction, and each neutral line of the phase coils extends to the other end of the stator core. The stator includes a connection ring made of an electrical conductor and disposed at the other end of the stator core to simultaneously connect the neutral lines of the phase coils.

14 Claims, 22 Drawing Sheets

(51) Int. Cl.
*H02K 9/06* (2006.01)
*H02K 3/52* (2006.01)

(58) Field of Classification Search
CPC ...... H02K 2203/09; H02K 3/345; H02K 3/38;
H02K 3/28; H02K 3/34; H02K 11/30;
H02K 11/33
USPC .......................................................... 310/71
See application file for complete search history.

(56) References Cited

U.S. PATENT DOCUMENTS

| | | | |
|---|---|---|---|
| 2018/0262092 A1* | 9/2018 | Beyerl | H02K 11/33 |
| 2018/0287449 A1* | 10/2018 | Iga | H01R 25/168 |
| 2019/0082917 A1* | 3/2019 | Shiozawa | H02K 1/148 |
| 2021/0021171 A1 | 1/2021 | Hong et al. | |

FOREIGN PATENT DOCUMENTS

| | | | |
|---|---|---|---|
| JP | 2019-180200 A | | 10/2019 |
| KR | 10-2015-0057566 | | 5/2015 |
| KR | 10-2016-0013982 | | 2/2016 |
| KR | 10-2017-0052986 | | 5/2017 |
| KR | 101766121 | | 8/2017 |
| KR | 102051599 | | 1/2020 |
| KR | 10-2020-0110809 | | 9/2020 |
| KR | 20200110809 A | * | 9/2020 |
| KR | 10-2021-0007481 A | | 1/2021 |
| KR | 10-2021-0012408 | | 2/2021 |

OTHER PUBLICATIONS

Extended European Search Report in European Appln. No. 22752894.0, mailed on Jun. 12, 2024, 8 pages.

* cited by examiner

MOTOR ASSEMBLY

CROSS-REFERENCE TO RELATED APPLICATIONS

This application is a National Stage application under 35 U.S.C. § 371 of International Application No. PCT/KR2022/000459, filed on Jan. 11, 2022, which claims the benefit of Korean Application No. 10-2021-0019423, filed on Feb. 10, 2021. The disclosures of the prior applications are incorporated by reference in their entirety.

TECHNICAL FIELD

The present disclosure relates to a motor assembly.

BACKGROUND ART

As is well known, a motor (a motor assembly) refers to an apparatus that converts electric energy into mechanical energy.

The motor generally includes a stator and a rotor rotatably disposed with respect to the stator.

The stator includes a stator core, a stator coil wound around the stator core, and an insulator for insulating the stator from the stator coil.

Among such motors, in a case of motors applied to a so-called hand-held device held by a hand to be used, such as a hair dryer or a cleaner, there is a need to reduce a size and weight for users' convenience.

A motor used for the hand-held device may include an impeller configured to generate pressure during rotation and a housing configured to accommodate the impeller therein.

Since the motor (motor assembly) of the hand-held device is generally configured to have a reduced size and weight in consideration of the users' convenience, "high-speed operation" at a comparatively high rotation speed is needed to maintain constant air flow volume and/or wind pressure.

However, in a case of a motor assembly in the related art, when sizes of a stator and a rotor are reduced to constitute a small motor assembly, since a space between wires (a power line and a neutral line) of a stator coil is reduced, an insulation distance is not easily ensured. Thus, there may be a limit in reducing the sizes of the stator and the rotor.

Meanwhile, in the motor assembly in the related art, when a size of a stator is reduced, a space between teeth of the stator is relatively reduced, and a stator coil may not easily be wound around of the teeth. Thus, there is a limit in reducing a size of the stator.

In consideration of such problems, there are some cases of using a small-sized motor including a so-called "split core" such that a stator core is manufactured to be divided into a yoke having an annular shape and teeth coupled to an inner surface of the yoke, stator coils are respectively wound around the teeth before coupling of the teeth, and then, the teeth wound by the stator coils are coupled to the yoke.

However, with respect to a small-sized motor assembly including the split core in the related art, when one end parts (power line) of coil portions (wires) wound around the teeth are connected to a power source and other end parts of the coil portions (wires) are integrally electrically connected (Y-connected) to each other, it may be difficult to ensure an insulation distance between the wires when the wires overlap each other.

In addition, with respect to the small-sized motor assembly including the split core in the related art, a power line connection portion for connecting the one end parts (power lines) of the coil portions (wires) wound around the teeth to a power source need to be defined, and a neutral line connection portion for connecting another end parts (neutral lines) of the coil portions (wires) to one side of the power line connection portion needs to be defined. Thus, since a comparatively large occupying space is needed to ensure an insulation distance between the power lines and the neutral lines, it may be difficult to have a small-sized motor.

In addition, since the power line connection portion and the neutral line connection portion are intensively disposed in an end portion of one side of the stator in an axial direction, occupying areas of the power line connection portion and the neutral line connection portion relative to a sectional are of the stator comparatively increase, thereby reducing a flow sectional area of air moved by the impeller. Thus, air flow resistance and noise may be increased.

PRIOR ART DOCUMENT

Patent Document (Patent Document 1) KR 10-2051599 B1
(Patent Document 2) KR 10-2017-0052986 A
(Patent Document 3) KR 10-2016-013982 A
(Patent Document 4) KR 10-1766121 B1

DISCLOSURE OF INVENTION

Technical Problem

Therefore, an aspect of the detailed description is to provide a motor assembly in which an insulating distance for a stator core may be easily ensured.

In addition, another aspect of the detailed description is to provide a motor assembly such that an increase in a size of an outer shape to ensure an insulation distance for a stator coil may be suppressed, and motor assembly miniaturization is facilitated.

In addition, still another aspect of the detailed description is to provide a motor assembly capable of suppressing increases in air flow resistance and noise caused by a concentrated disposition of a power line connection portion and a neutral line connection portion.

Solution to Problem

To achieve these and other advantages and in accordance with the purpose of the present disclosure, as embodied and broadly described herein, there is provided a motor assembly in which wire connection positions of a stator coil may be distributed along an axial direction.

In detail, the stator coil may include a plurality of phase coils, and connection of power lines and neutral lines of the plurality of phase coils are distributed along an axial direction. Thus, an insulation distance between the power lines and the neutral lines of the stator coil may be easily ensured.

In addition, since the power lines and the neutral lines are respectively disposed in a distributive method along an axial direction, an increase of a size of the stator to ensure an insulation distance when the power lines and the neutral lines overlap each other may be suppressed, and a motor assembly appropriate for miniaturization may be provided.

The motor assembly according to one implementation of the present disclosure may include: a stator including a stator core having a plurality of teeth, a stator coil having a plurality of phase coils wound on the plurality of teeth, respectively, and an insulator interposed between the stator core and the stator coil to insulate the stator coil; and a rotor having a rotation shaft, spaced apart from the stator with a space therebetween, and rotatably disposed, each of power lines of the plurality of phase coils extends to one end of the stator core along an axial direction, and each of neutral lines of the plurality of phase coils extends to another end of the stator core, and the stator further includes a connection ring made of an electrical conductor and disposed at the another end of the stator core to simultaneously connect the neutral lines of the plurality of phase coils.

The stator coil is configured to be connected to a three-phase alternate current (AC) power source.

The stator coil includes a plurality of phase coils connected to each phase (a u-phase, a v-phase, a w-phase) of the three-phase AC power source.

Power lines of the plurality of phase coils extend toward one end of the stator along an axial direction, and neutral lines of the plurality of phase coils extend toward another end of the stator along an axial direction.

By doing so, when the power lines and the neutral lines of the plurality of phase coils are connected to each other, the power lines and the neutral lines do not overlap each other. Thus, an insulation distance for the power lines and an insulation distance for the neutral lines may be easily ensured.

According to one implementation of the present disclosure, the rotor is configured to include a rotating shaft and a permanent magnet configured to rotate with reference to the rotating shaft.

The permanent magnet has a cylindrical shape, and a rotating shaft hole is provided through the permanent magnet so that the rotating shaft is inserted therein.

The rotating shaft is configured to have a great length to protrude toward both sides of the permanent magnet.

The rotating shaft is configured such that both sides (end portions) are rotatably supported by a bearing.

The bearing is configured to include an outer ring, an inner ring concentrically disposed in the outer ring, and a plurality of balls disposed between the outer ring and the inner ring.

According to one implementation of the present disclosure, the stator core includes a yoke having a ring shape and a plurality of teeth are configured to be decoupled or coupled to an inner surface of the yoke in an axial direction.

By doing so, before the plurality of teeth are coupled to the yoke, as the plurality of phase coils are wound around the plurality of teeth, respectively, a size of an outer shape of the stator may be remarkably reduced.

By doing so, a small motor assembly in which the stator and the rotor has a remarkably smaller outer shape (size) may be provided.

In one implementation of the present disclosure, the insulator includes yoke insulators disposed in the yoke and teeth insulators disposed in the teeth.

The yoke insulator is configured to block (insulate) both ends of the yoke and an inner surface of the yoke in an axial direction.

The yoke insulators are configured to be coupled to each other in an axial direction.

The yoke insulators include a first yoke insulator and a second yoke insulator coupled to each other in an axial direction to have the yoke therebetween.

The teeth insulators are configured to have a rectangular section to block (insulate) a circumferential surface of the teeth (both ends and both side surface portions of the yoke in an axial direction).

The teeth insulators are configured to be coupled to each other in an axial direction.

The teeth insulators include a first teeth insulator and a second teeth insulator coupled to each other in an axial direction to have the teeth therebetween.

By doing so, when the yoke and the teeth are coupled to each other, the yoke and the plurality of phase coils may be insulated from each other.

According to one implementation of the present disclosure, the connection ring is configured to include a body disposed along a circumferential direction of the stator core; and a plurality of neutral line connection portions protruding from the body and connected to the neutral lines, respectively.

Here, the body is made of an electric conductor member having a long plate shape in which a length is greater than a width.

The body is configured to be plastically deformed to have an arcuate shape with one side open along a circumferential direction such that a thickness is disposed in a radial direction of the stator.

Here, an outer diameter of the body is configured to be smaller than that of the stator (stator core).

An inner diameter of the body is configured to be smaller than that of the stator (stator core).

By doing so, since the connection ring is plastically deformed to have an arcuate shape along a thickness direction of the body, a comparatively small force is needed for the plastic deformation of the body, and thus, manufacture may be easily performed.

According to one implementation of the present disclosure, the connection ring is coupled to an end of the stator such that a width of the body is disposed along an axial direction.

According to one implementation of the present disclosure, the connection ring is coupled to an end of the stator along an axial direction.

Here, the connection ring is configured such that a diameter of an outer surface (a maximum outer diameter) is smaller than an outer diameter of the stator (stator core), and a diameter of an inner surface (a minimum inner diameter) is greater than an inner diameter of the stator (stator core). Thus, a contact with air passing through the stator along an axial direction may be suppressed.

By doing so, an increase in air flow resistance due to the connection ring may be suppressed, and an increase in noise due to the connection ring may be suppressed.

According to one implementation of the present disclosure, the stator is disposed in the insulator and includes a connection ring support portion supporting the connection ring.

By doing so, an additional insulating member for insulating the connection ring may not be used.

According to one implementation of the present disclosure, the connection ring support portion is configured to include internal support portions disposed inside the body and external support portions disposed outside the body along a radial direction of the stator.

By doing so, the connection ring may be prevented from being moved respectively toward an inner side and an outer side along a radial direction of the stator.

The internal support portions and the external support portions may be respectively configured to protrude in an axial direction.

According to one implementation of the present disclosure, the internal support portions have lengths corresponding to axial lengths of the plurality of phase coils, respectively, and are respectively disposed outside the plurality of phase coils.

Here, the internal support portions may be configured to have a same length as a height of the phase coils in an axial direction, or have a length further protruding compared to the phase coils.

Thus, one ends of the plurality of phase coils (outer end) may be suppressed from being moved outwardly along a radial direction of the stator.

In this configuration, the connection ring and the plurality of phase coils are suppressed from approaching each other by the internal support portions to spaced be apart from each other by a preset distance.

According to one implementation of the present disclosure, the external support portions have an extended length along a circumferential direction of the stator, compared to a length of the internal support portions.

The external support portions have a contact surface having a curvature corresponding to a circular arc of the connection ring to be in surface contact with an outer surface of the connection ring.

By doing so, the connection ring may be stably supported, and suppressed from unexpectedly being deviated from an original coupling position when an external force is exerted.

According to one implementation of the present disclosure, the connection ring includes an axial length smaller than that of the internal support portions.

The connection ring is configured to have an axial length smaller than an axial length of the internal support portions and greater than an axial length of the external support portions.

The external support portions are configured to have an axial length smaller than that of the connection ring.

By doing so, an axial length of the connection ring support portion (the external support portions and the internal support portions) may be properly adjusted to thereby prevent an excessive increase in an amount of materials to be used for the insulator.

In addition, the connection ring may be properly configured to be connected to the neutral lines, and an excessive weight increase due to the connection ring and the connection ring support portion may be suppressed.

According to one implementation of the present disclosure, the internal support portions include a separation prevention projection protruding outwardly along a radial direction of the stator to be in contact with one side of the connection ring in an axial direction.

By doing so, the connection ring may be suppressed from unexpectedly being deviated from the connection ring support portion along an axial direction after the coupling of the connection ring.

According to one implementation of the present disclosure, the neutral lines may be configured to be disposed on an inner side with reference to an extension line axially extending from an outer diameter surface of the stator core.

Thus, the neutral lines may be prevented from protruding outside the stator along a radial direction of the stator, and thus, interfering with a periphery.

The plurality of neutral line connection portions are disposed on an inner side with reference to an extension line axially extending from an inner surface of the stator core, and have a groove shape open toward both sides along a circumferential direction of the stator and open outwardly along a radial direction of the stator.

Thus, the neutral lines and the neutral line connection portions may be both coupled to each other on an inner side with reference to an extension line axially extending from an inner surface of the stator core.

Thus, a radial increase of an outer shape (size) of the stator due to connection between the neutral lines and the neutral line connection portions may be suppressed.

According to one implementation of the present disclosure, the plurality of neutral line connection portions respectively axially include a first radial direction section protruding inwardly from one end of the body along a radial direction, an axial direction section protruding from the first radial direction section in an axial direction, and a second radial direction section outwardly protruding from the axial direction section in a radial direction.

Here, after the plurality of teeth are coupled to the yoke, the connection ring may be coupled to an end of the stator core along an axial direction.

In this case, the connection ring may be coupled to the end of the stator core in a state when corresponding neutral line connection portions are rotated by a preset angle relative to corresponding neutral lines along a circumferential direction of the stator, to thereby prevent an interference between the neutral lines and the neutral line connection portions of the phase coils.

When a body of the connection ring is inserted between the internal support portions and the external support portions of the connection ring support portion, the body of the connection ring may be rotated along a circumferential direction of the stator so that an end of each of the neutral lines is inserted into a corresponding neutral line connection portion.

When each of the neutral lines is inserted into a corresponding neutral line connection portion, neutral line connection portions and neutral lines corresponding to each other may be integrally fixed and coupled to each other inside the respective neutral line connection portions.

Here, the neutral line connection portions and the neutral lines may be integrally fixed and coupled to each other by soldering.

According to one implementation of the present disclosure, the plurality of neutral line connection portions are disposed on an inner side with reference to an extension line axially extending from an inner surface of the stator core, and has a groove shape open toward both sides along a circumferential direction of the stator and open toward the stator core in an axial direction.

In this configuration, as the neutral lines and the neutral line connection portions are coupled to each other on an inner side with reference to an outer diameter of the stator core along a radial direction of the stator core, an outer shape of the stator core may be prevented from being enlarged in a radial direction due to the connection between the neutral lines and the neutral line connection portions.

According to one implementation of the present disclosure, each of the plurality of neutral line connection portions axially includes a first axial direction section protruding from one end of the body along an axial direction, a radial direction section protruding from the first axial direction section along a radial direction, and a second axial direction section protruding from the radial direction section in an axial direction.

In this configuration, in a state when the teeth and the yoke are coupled to each other, the connection ring may be coupled in the axial direction such that the neutral line connection portions are disposed in correspondence with corresponding neutral lines.

When the corresponding neutral lines are accommodated in the respective neutral line connection portions, the neutral line connection portions and the neutral lines may be integrally fixed to each other.

Here, the neutral line connection portions and the neutral lines may be integrally fixed to each other by soldering.

According to one implementation of the present disclosure, the motor assembly is configured to include a housing having an accommodation space disposed therein; and an impeller disposed on one side in the housing, Here, the stator is disposed on an upstream side of the impeller in the housing with reference to a flow of air moved during rotation of the impeller.

In this configuration, during the rotation of the impeller, air outside the housing flows into the housing, and then, is discharged to outside of the housing via the stator, and then, the impeller.

Thus, since air outside the housing at a comparatively low temperature is in contact with the stator first, cooling of the stator may be facilitated.

According to one implementation of the present disclosure, the stator includes power line connection portions respectively protruding axially from an opposite end of the connection ring along an axial direction, and connected to the power lines of the plurality of phase coils, respectively.

Here, the power line connection portions are disposed in the teeth insulator.

The neutral line connection portions are disposed in opposite ends of the power line connection portions of the teeth insulator.

According to one implementation of the present disclosure, the motor assembly includes a printed circuit board (PCB) spaced apart from an end of the housing, The PCB is configured to include a substrate and a power supply circuit disposed on the substrate and configured to supply a three-phase alternate current (AC) power to the stator coil (a plurality of phase coils).

The power line connection portions include a PCB connection terminal protruding in an axial direction to be connected to the PCB.

The PCB includes a PCB connection terminal insertion portion into which the PCB connection terminal is inserted (coupled).

According to one implementation of the present disclosure, the motor assembly includes a bracket including the bearing and coupled to an end of the housing.

The bracket is coupled to an upstream end of the housing with reference to a flow of air moved during rotation of the impeller.

The PCB is coupled to one side end of the bracket along an axial direction.

Advantageous Effects of Invention

As described above, according to one implementation of the present disclosure, each of power lines of a plurality of phase coils extends to one end of a stator core along an axial direction and each of neutral lines of the plurality of phase coils extends to another end of the stator core along an axial direction to be connected to a connection ring. Thus, an insulation distance between the power lines and the neutral lines of the plurality of phase coils may be easily ensured.

By doing so, occurrence of overlapping between the power lines and the neutral lines of the plurality of phase coils may be suppressed, and an increase in a size of a stator in a radial direction to ensure an insulation distance between the power lines and the neutral lines overlapping each other may be suppressed.

In addition, the connection ring is made of an electric conductor having a long plate shape and is plastically deformed to have an arcuate shape such that a thickness is disposed in a radial direction of the stator. Thus, manufacture thereof may be easily performed.

In addition, the connection ring is coupled to an end of the stator such that a width of a body is disposed along an axial direction. Thus, a contact with air passing through the stator along an axial direction may be suppressed.

In addition, internal support portions are disposed inside the connection ring and external support portions are disposed outside the connection ring along a radial direction of the stator. Thus, the connection ring may be prevented from being moved along a radial direction of the stator.

In addition, the internal support portions have lengths corresponding to axial lengths of the plurality of phase coils, respectively, and are disposed outside of the plurality of phase coils. Thus, the phase coils may be suppressed from being moved outwardly, and the connection ring may be suppressed from being moved inwardly.

In addition, the internal support portions include a separation prevention projection protruding along a radial direction and disposed at one side of the connection ring. Thus, after the coupling of the connection ring, the connection ring may be suppressed from unexpectedly being deviated from a connection ring support portion.

In addition, the respective neutral lines of the plurality of phase coils and neutral line connection portions of the connection ring are disposed on an inner side with reference to an extension line axially extending from an outer diameter surface of the stator core. Thus, enlargement of an outer shape (size) of the stator in a radial direction due to connection between the neutral lines and the neutral line connection portions may be suppressed.

In addition, the neutral line connection portions have a groove shape open outwardly. Thus, inside of the neutral line connection portions may be easily welded.

In addition, the neutral line connection portions have a groove shape open toward the stator core along an axial direction. Thus, axial coupling between the neutral lines and the neutral line connection portions may be easily performed.

In addition, the stator includes a yoke and a plurality of teeth coupled to the yoke. Thus, since a plurality of phase coils may be wound before the coupling of the plurality of teeth, an increase in a size of the stator for ensuring a space for winding the plurality of phase coils around the teeth may be suppressed.

MODE FOR THE INVENTION

Figure 1:
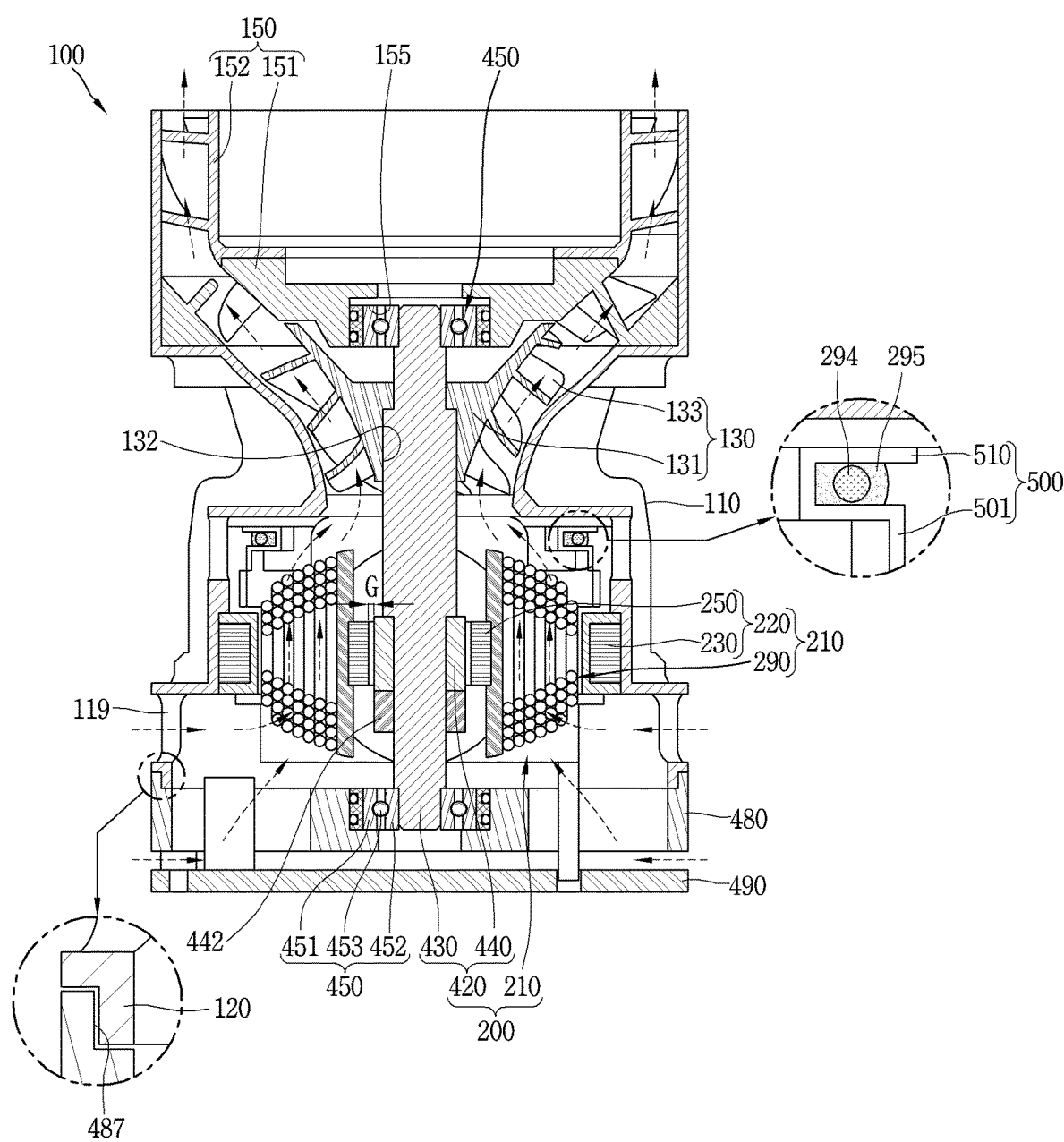
FIG. 1 is a sectional view of a motor assembly in accordance with one implementation of the present disclosure.

Hereinafter, implementations of the present disclosure will be described in detail with reference to the accompanying drawings. For the sake of brief description with reference to the drawings, the same or equivalent components will be provided with the same reference numerals, and description thereof will not be repeated. A singular representation used herein may include a plural representation unless it represents a definitely different meaning from the context. In describing the present disclosure, if a detailed explanation for a related known function or construction is considered to unnecessarily divert the gist of the present disclosure, such explanation has been omitted but would be understood by those skilled in the art. The accompanying drawings are used to help easily understand the technical idea of the present disclosure and it should be understood that the idea of the present disclosure is not limited by the accompanying drawings.

Figure 2:
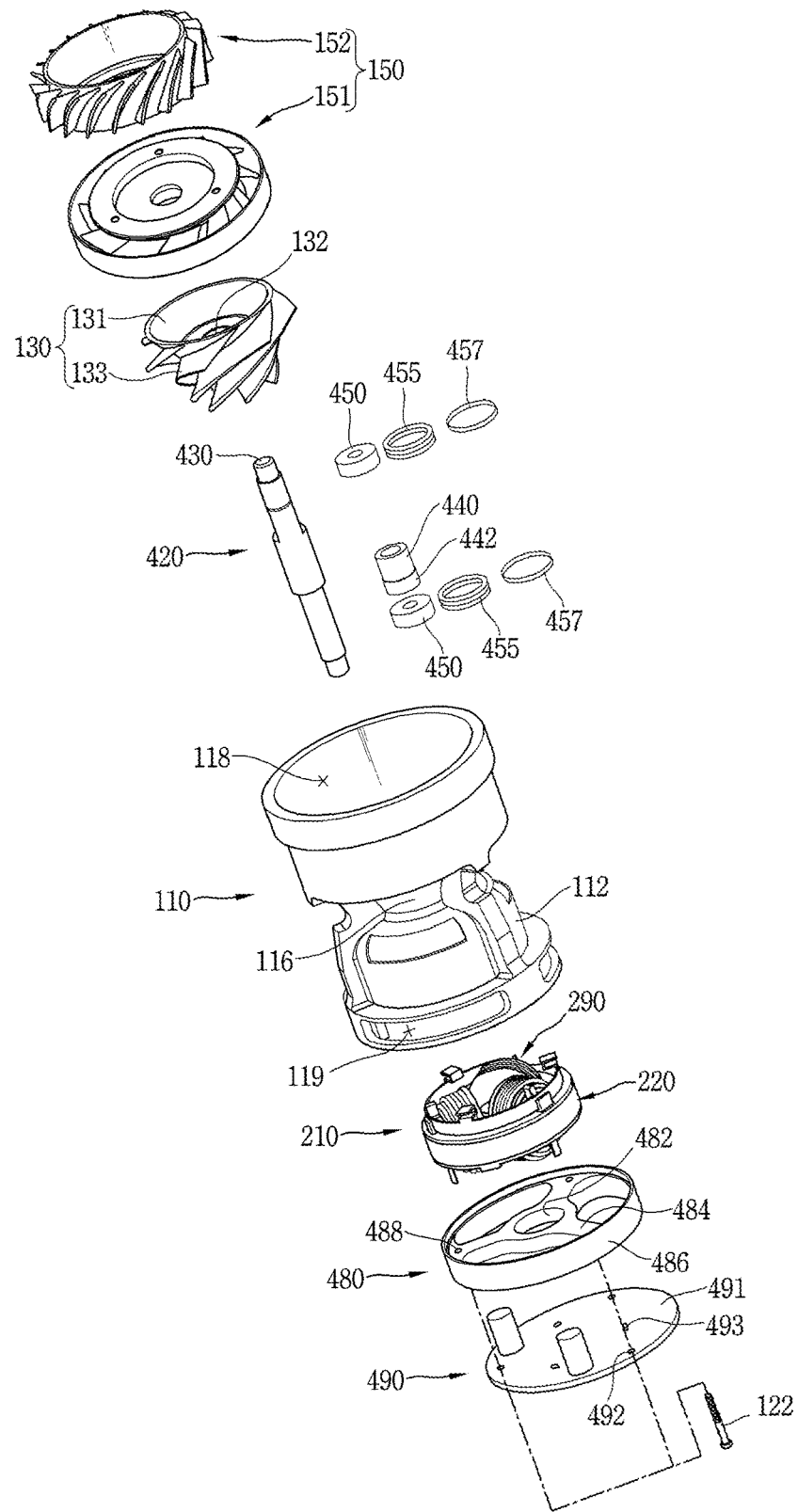
FIG. 2 is an exploded perspective view of the motor assembly of FIG. 1.

FIG. 1 is a sectional view of a motor assembly in accordance with one implementation of the present disclosure. FIG. 2 is an exploded perspective view of the motor assembly of FIG. 1. As illustrated in FIGS. 1 and 2, a motor assembly 100 according to this implementation includes a stator 210, a rotor 420, and a connection ring 500.

The stator 210 is accommodated in the housing 110.

The housing 110 defines, for example, an accommodation space with both ends open.

An impeller 130 is included on one side in the housing 110.

By doing so, when the impeller 130 rotates, air outside the housing 110 is discharged to outside of the housing 110 via inside of the housing 110.

The impeller 130 may be implemented, for example, as a mixed flow impeller configured to suck air in a radial direction and discharge the air to be inclined relative to the axial direction.

The impeller 130 includes, for example, a hub 131 and a plurality of blades 133 disposed around the hub 131. The hub 131 includes a rotating shaft hole 132 into which a rotating shaft 430 of the rotor 420 is to be inserted.

The stator 210 is disposed in the housing 110.

The rotor 420 is rotatably disposed in the stator 210 to have a preset space, i.e., an air gap G therebetween.

Here, the stator 210 and the rotor 420 may be referred to as an impeller driving portion 200 in that the stator 210 and the rotor 420 rotatably drive the impeller 130 by providing driving force to the impeller 130.

The stator 210 is positioned on an upstream side of the impeller 130 with reference to a flow of air moved when the impeller 130 rotates.

A stator accommodation portion 112 in which the stator 210 is accommodated is disposed on one side in the housing 110.

The housing 110 is configured to include a central region in which a width gradually decreases along an axial direction.

An impeller accommodation portion 114 in which the impeller 130 is accommodated is positioned on another side in the housing 110.

A vane 150 is positioned on a downstream side of the impeller 130 with reference to a flow of air moved by the impeller 130.

The vane 150 is configured to guide the air moved by the impeller 130.

The vane 150, for example, may include a first vane 151 and a second vane 152 coupled to each other in an axial direction.

A vane accommodation portion 116 is disposed inside the housing 110 to accommodate the vane 150 therein.

The stator 210 may include, for example, a stator core 220 and a stator coil 290 wound around the stator core 220.

The stator core 220 includes a plurality of teeth 250 and a plurality of slots 270.

The stator 210 includes, for example, an insulator 300 configured to insulate the stator core 220 from the stator coil 290.

Here, the stator coil 290 may be configured to be connected to a three-phase alternate current (AC) power source.

A rotor accommodation hole 259 for accommodating the rotor 420 therein is defined in the stator 210. The rotor accommodation hole 259 may be penetrated therethrough in the axial direction.

The rotor 420 includes, for example, the rotating shaft 430 and a permanent magnet 440 rotating centering on the rotating shaft 430.

An end ring 442 may be disposed on one side (a lower side in the drawing) of the permanent magnet 440 along the axial direction.

In this implementation, an example in which the end ring 442 is disposed on one side (a lower side) of the permanent magnet 440 is described. However, an end ring may be configured to be disposed in both ends (upper and lower side) of the permanent magnet 440.

In this implementation, the motor assembly 100 is implemented as a small-sized motor assembly 100 to be applied to a hand-held device.

The motor assembly 100 may be, for example, implemented as the small-sized motor assembly 100 to be applied to a cleaner.

In detail, for example, the motor assembly 100 may be implemented as a small-sized motor assembly including the stator 210 with an outer diameter of 30 to 50 mm and the rotor 420 with an outer diameter of 8 to 12 mm.

The motor assembly 100 in this implementation may be configured such that, for example, the rotor 420 rotates at 120 to 185 krpm.

The rotating shaft 430 of the rotor 420 may be rotatably supported on both sides (end portions).

In detail, a bearing 450 may be provided respectively in both end portions of the rotating shaft 430.

The bearing 450 may be implemented, for example, as a ball bearing.

The bearing 450 may include an outer ring 451, an inner ring 452 concentrically included in the outer ring 451, and a plurality of balls 453 disposed between the outer ring 451 and the inner ring 452.

The bearing 450 may be accommodated in and supported by a holder 455.

A sealing member 457 may be positioned on an outer surface of the holder 455.

The bearing 450 disposed on a downstream end of the rotating shaft 430 with reference to a flow of the air moved by the impeller 130 and may be included in the first vane 151.

The first vane 151 includes a bearing accommodation portion 155 configured to accommodate the bearing 450 therein. The bearing accommodation portion 155 is configured to have one side open to accommodate the bearing 450 therein in an axial direction.

The bearing 450 disposed on an upstream end of the rotating shaft 430 may be included in a bracket 480.

The bracket 480 may be configured to include, for example, a bearing accommodation portion 482 in which the bearing 450 is accommodated, a plurality of spoke portions 484 radially extending from the bearing accommodation portion 482, and a rim portion 486 connecting the plurality of spokes 484.

The plurality of spoke portions 484 are spaced apart from each other along a circumferential direction.

A through portion 485 through which air passes is disposed between the plurality of spoke portions 484.

After air is introduced into the housing 110 through a lower end of the housing 110 during rotation of the impeller 130, the air may be discharged through an upper end of the housing 110 via the space G and the through portion 485.

In this configuration, as air outside the housing 110 and having a comparatively low temperature passes through the stator 210, the air cools each of the stator 210 and the rotor 420. Particularly, as the stator coil 290 generates a comparatively great amount of heat and has a high temperature, cooling of the stator coil 290 may be facilitated.

The bracket 480 includes a housing coupling portion 120 into which an end portion of the housing 110 is to be inserted to a preset depth.

The housing 110 includes an insertion portion 120 to be inserted into the bracket 480.

A printed circuit board (PCB) 490 is disposed on one side of the bracket 480 in an axial direction.

The PCB 490 may be configured to include, for example, a substrate 491 and a plurality of circuit components 495 disposed on the substrate 491.

The PCB 490 (the substrate 491) may be coupled to the bracket 480 and the housing 110 by a fixing member 122. A fixing member insertion hole 492 into which the fixing member 122 is inserted is provided through the PCB 490.

A PCB connection terminal 377 is disposed on one side end (a lower side in the drawing) of the stator 210 along an axial direction.

The connection ring 500 is disposed on another side end (an upper side in the drawing) of the stator 210 along an axial direction.

Figure 3:
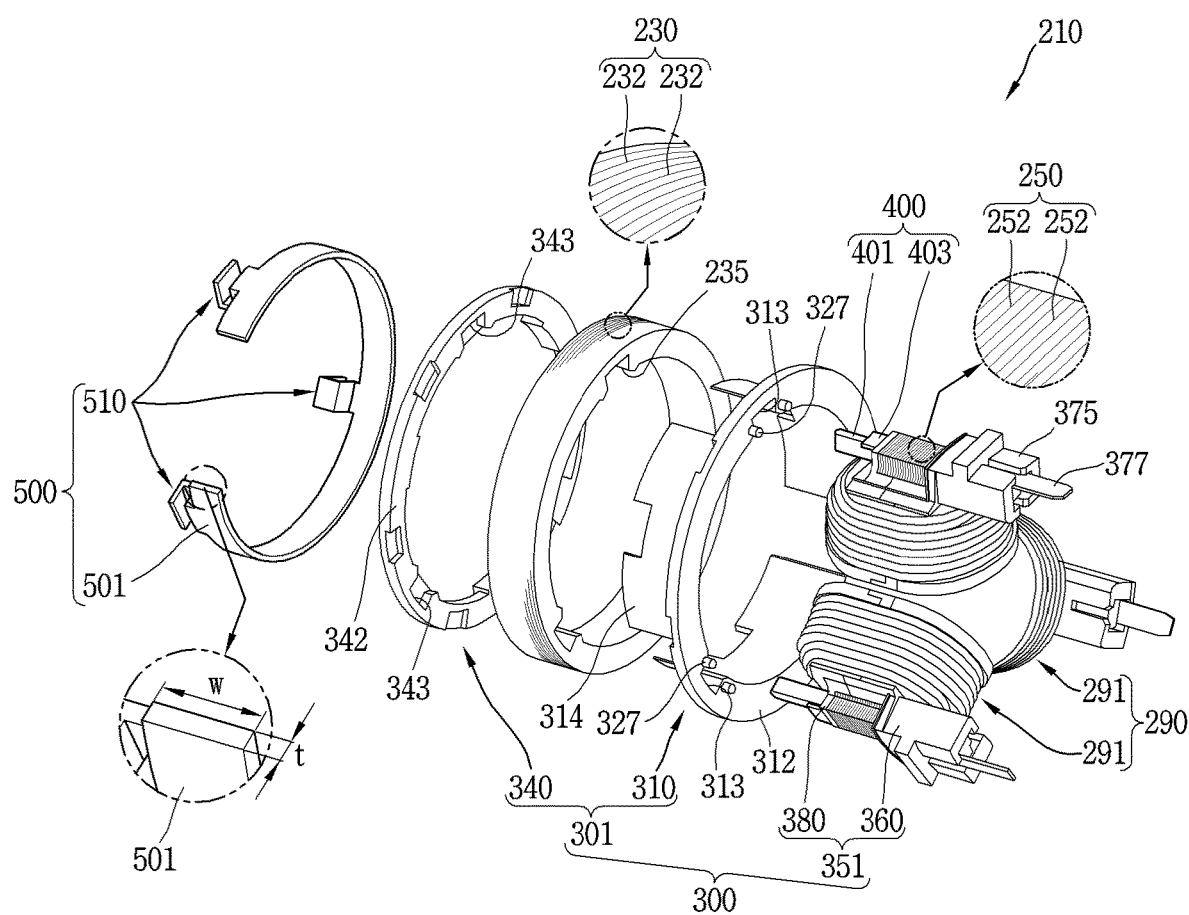
FIG. 3 is an exploded perspective view of a stator of FIG. 2.

FIG. 3 is an exploded perspective view of the stator of FIG. 2. As illustrated in FIG. 3, the stator 210 is configured to include the stator core 220, the stator coil 290, wound on the stator core 220, and the insulator 300 insulating the stator core 220 from the stator coil 290.

The stator 210 is configured, for example, to include a yoke 230 having a ring (annular) shape and a plurality of teeth 250 coupled to the yoke 230.

The yoke 230 may be implemented to have a circular ring shape (a ring shape).

The yoke 230 may be provided, for example, by stacking a plurality of electrical steel sheets 232 having a circular ring shape using an insulating manner.

The plurality of teeth 250 may be respectively implemented, for example, to be disposed in a radial direction (radially) from an inner surface of the yoke 230.

The plurality of teeth 250 may be respectively implemented, approximately, to have a bar shape.

The plurality of teeth 250 may be provided, for example, by stacking a plurality of electrical steel sheets 252 using an insulating method.

The insulator 300 may be configured, for example, to include a yoke insulator 301 for insulating the yoke 230 and a teeth insulator 351 for insulating the teeth 250.

The yoke insulator 301, for example, includes a first yoke insulator 310 and a second yoke insulator 340 coupled to each other in an axial direction.

The first yoke insulator 310 is configured, for example, to include an end insulating portion 312 for insulating (blocking) one end (a right end of FIG. 3) of the yoke 230 along an axial direction and a yoke inner surface insulating portion 314 for insulating an inner surface of the yoke 230.

The second yoke insulator 340 is configured, for example, to include an end insulating portion 342 for insulating another end (a left end of FIG. 3) of the yoke 230.

The teeth insulator 351, for example, includes a first teeth insulator 360 and a second teeth insulator 380 coupled to each other in an axial direction.

The stator coil 290 may include, for example, a plurality of phase coils 291 connected to each phase (a u-phase, a v-phase, a w-phase) of a three-phase AC power source.

The plurality of phase coils 291 may be implemented, for example, to be intensively wound around the plurality of teeth 250, so called, using a concentrated winding method.

One end parts of the plurality of phase coils 291 are connected to the three-phase AC power source, and thus, may be referred to as "power lines 293."

Other end parts of the plurality of phase coils 291 are electrically connected (Y-connected) to each other, and thus, may be referred to as "neutral lines 294."

In this implementation, the respective power lines 293 of the phase coils 291 may axially extend to one end of the stator 210 (a right end in FIG. 3), and the respective neutral lines 294 of the phase coils 291 may axially extend to another end of the stator 210 (a left end in FIG. 3).

In this configuration, the power lines 293 and the neutral lines 294 of the phase coils 291 may be suppressed from overlapping or being disposed to adjacent to each other.

By doing so, when the power lines 293 and the neutral lines 294 of the phase coils 291 are connected to each other, an insulation distance may be easily ensured.

Power line connection portions 375 connected to the respective power lines 293 of the phase coils 291 are disposed on one side of the stator 210 (a right side in the drawing).

The connection ring 500 electrically connected to each of the neutral lines 294 of the phase coils 291 is disposed on another side of the stator 210 (a left side in the drawing).

The connection rings 500 is made of an electric conductor.

The connection ring 500 is configured to include, for example, a body 501 disposed along a circumferential direction of the stator core 220, and a plurality of neutral line connection portions 510 protruding from the body 501 and connected to the neutral lines 294, respectively.

The body 501 has a long plate shape in which a length is greater than a width w.

The body 501 of the connection ring 500 may be plastically deformed to have an arcuate shape with one end open along a circumferential direction such that a thickness t is disposed in a radial direction of the stator 210.

In this configuration, with respect to the plastic deformation of the body 501, since the body 501 may be plastically deformed by a relatively small pressing force, the connection ring 500 may be easily manufactured.

Here, an internal angle of lines connecting both ends of the connection ring 500 (the body 501) to the stator core 220 in a circumferential direction may be configured, for example, to constitute 240 degrees.

By doing so, an amount of a material to be used (an amount required) for the connection ring 500 may be reduced.

Figure 4:
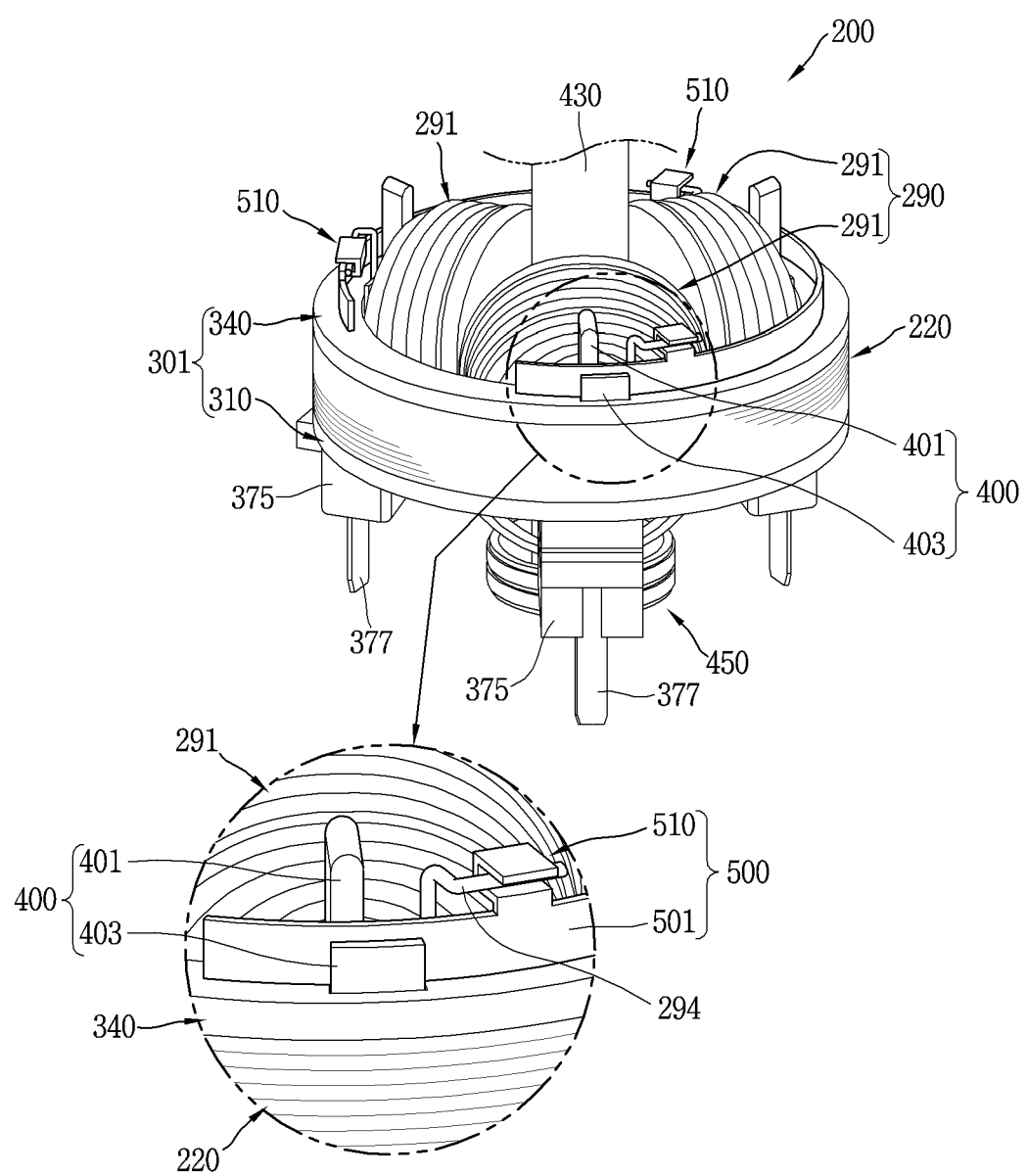
FIG. 4 is a perspective view of a coupling state of a connection ring of FIG. 3.

FIG. 4 is a perspective view of a coupling state of the connection ring of FIG. 3. As illustrated in FIG. 4, the neutral lines 294 of the phase coils 291 may be bent to be positioned in locations corresponding to the neutral connection portions 510 along an axial direction.

In detail, the neutral lines 294 may be configured, for example, to include a first section 294a disposed in an axial direction, a second section 294b bent from the first section 294a in a radial direction, a third section 294c bent from the second section 294b in a circumferential direction.

In this implementation, an example in which the neutral lines 294 include the first section 294a, the second section 294b, and the third section 294c is described. However, this is only an example, and the present disclosure is not limited thereto. The neutral lines 294 may be configured to include the first section 294a and a second section (not shown) bent from an end of the first section 294a and disposed in a circumferential direction.

Here, the neutral lines 294 and the connection ring 500 (the neutral connection portions 510) are configured to be disposed on an inner side with reference to an extension line (a first extension line L1) axially extending from an outer diameter surface of the stator core 220.

By doing so, the neutral lines 294 and the neutral line connection portions 510 of the connection ring 500 may be connected to each other inside the outer diameter surface of the stator core 220.

Thus, when the neutral lines 294 and the neutral line connection portions 510 are connected to each other, an increase of a size of the stator 210 in a radial direction to ensure an insulation distance may be suppressed.

The connection ring 500 is coupled to one end (an upper end in the drawing) of the stator 210 so that the width w of the body 501 is disposed in an axial direction.

Connection ring support portions 400 for supporting the connection ring 500 is included in the stator 210.

The connection ring support portions 400 may be, for example, disposed on the insulator 300.

The connection ring support portions 400 may be, for example, disposed in the teeth insulator 351 (the second teeth insulator 380).

In this configuration, since the connection ring support portions 400 are made of an insulation member, use of a separate insulation member for insulating the connection ring 500 may not be needed.

The connection ring support portions 400 may be configured, for example, to include an internal support portion 401 disposed inside the body 501 and an external support portion 403 disposed outside the body 501 along a radial direction of the stator 210.

The internal support portion 401 and external support portion 403 are spaced apart from each other to have a width corresponding to the thickness t of the connection ring 500 in a radial direction of the stator core 220.

The internal support portion 401 is in contact with an inner surface of the connection ring 500, and the external support portion 403 is in contact with an outer surface of the connection ring 500.

The internal support portion 401 and the external support portion 403 may be respectively configured, for example, to protrude from an end of the stator core 220 (the teeth 250) in an axial direction.

Here, the internal support portion 401 may be configured to have a same length as a height of the phase coils 291 in an axial direction, or have a great length to further protrude from the phase coils 291 in an axial direction.

In this configuration, the phase coils 291 may be suppressed from being moved outwardly in a radial direction.

In addition, the connection ring 500 may be suppressed from being moved inwardly in a radial direction.

The external support portion 403 may be, for example, configured to have an extended length along a circumferential direction of the stator 210 compared to the inner support portion 401.

Referring to FIG. 4, one end of the external support portion 403 (a left end in the drawing) and one end of the internal support portion 401 are disposed almost on a same line in a radial direction of the stator 210, and another end of the external support portion 403 (a right end in the drawing) further extends in a counter-clockwise direction compared to another end of the internal support portion 401.

The external support portion 403 may be, for example, configured to have a protruding length smaller than that of the internal support portion 401 along an axial direction with reference to the stator core 220.

The external support portion 403 may be, for example, configured to have a protruding length smaller than a width of the body 501 of the connection ring 500 along an axial direction with reference to the stator core 220.

Referring to FIG. 4, the external support portion 403 is configured to have a protruding length smaller than protruding lengths of the internal support portion 401 and the body 501 of the connection ring 500 along an axial direction with reference to the stator core 220.

With reference to the stator core 220 in an axial direction, the body 501 of the connection ring 500 further protrudes along an axial direction, compared to the external support portion 403.

With reference to the stator core 220 in an axial direction, the internal support portion 401 further protrudes compared to the external support portion 403 and the body 501.

Here, the external support portion 403 is configured to be in surface contact with the connection ring 500.

The external support portion 403 may be configured to have a contact surface having a curvature corresponding that of to an outer diameter of the connection ring 500.

The power line connection portions 375 are disposed at a side opposite to the connection ring 500 along an axial direction. The PCB connection terminal 377 is included in each of the power line connection portions 375.

Figure 5:
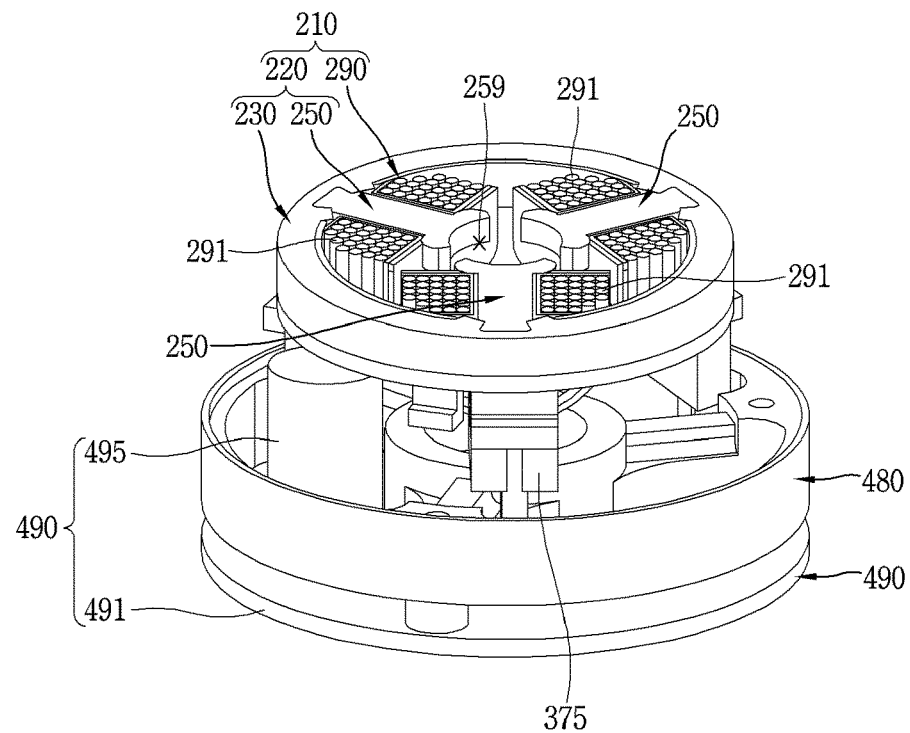
FIG. 5 is a sectional view for explaining a configuration of the stator of FIG. 2.
Figure 6:
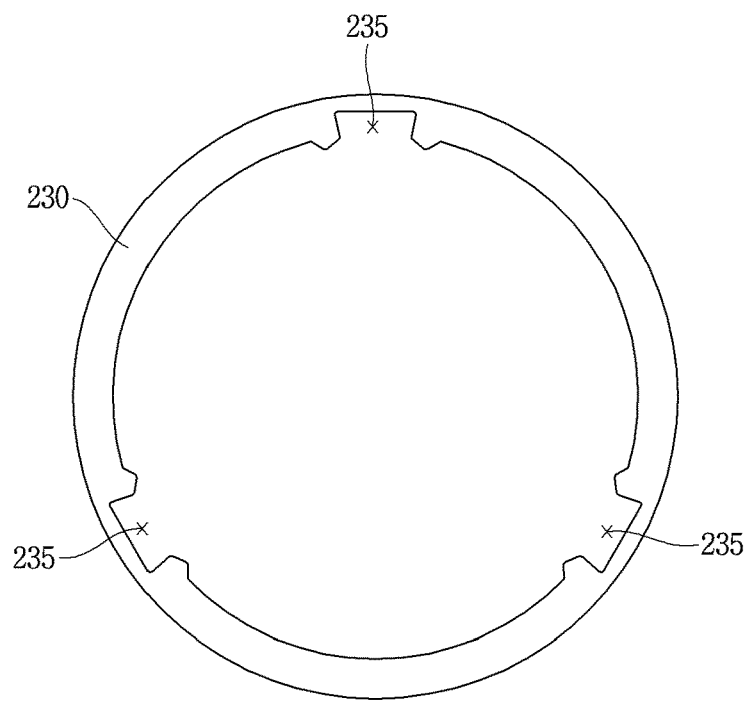
FIG. 6 is a planar view of a yoke of FIG. 5.
Figure 7:
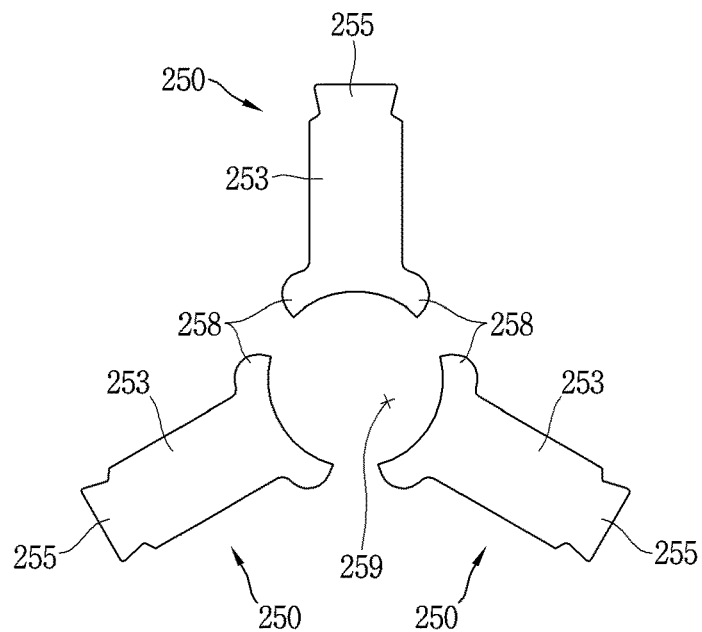
FIG. 7 is a planar view of teeth of FIG. 5.

FIG. 5 is a sectional view for explaining a configuration of the stator of FIG. 2. FIG. 6 is a planar view of the yoke of FIG. 5. FIG. 7 is a planar view of the teeth of FIG. 5. As illustrated in FIG. 5, the stator core 220 includes the yoke 230 and the plurality of teeth 250 coupled to the yoke 230.

In this implementation, three teeth 250 are implemented.

As illustrated in FIG. 6, a plurality of teeth coupling portions 235 are disposed in the yoke 230 to be coupled to the plurality of teeth 250.

Three teeth coupling portions 235 are implemented to correspond to a number of the plurality of teeth 250.

As illustrated in FIGS. 5 and 7, the plurality of teeth 250 include coupling ends 255 coupled to the yoke 230, respectively.

The coupling ends 255, for example, may be implemented to have a dovetail shape.

In correspondence with the dovetail shape, the teeth coupling portions 235 are implemented to have a dovetail groove shape.

Shoes 258 extending respectively to both sides along a circumferential direction are disclosed on an inner end of the teeth 250.

A rotor accommodation hole 259 for rotatably accommodating the rotor 420 therein is disposed on inner surfaces of the shoes 258.

The plurality of phase coils 291 are wound around the plurality of teeth 250, respectively.

The phase coils 291 are respectively configured to include a long wire (an electric conductor) to be wound around the plurality of teeth 250 according to preset turns.

Figure 8:
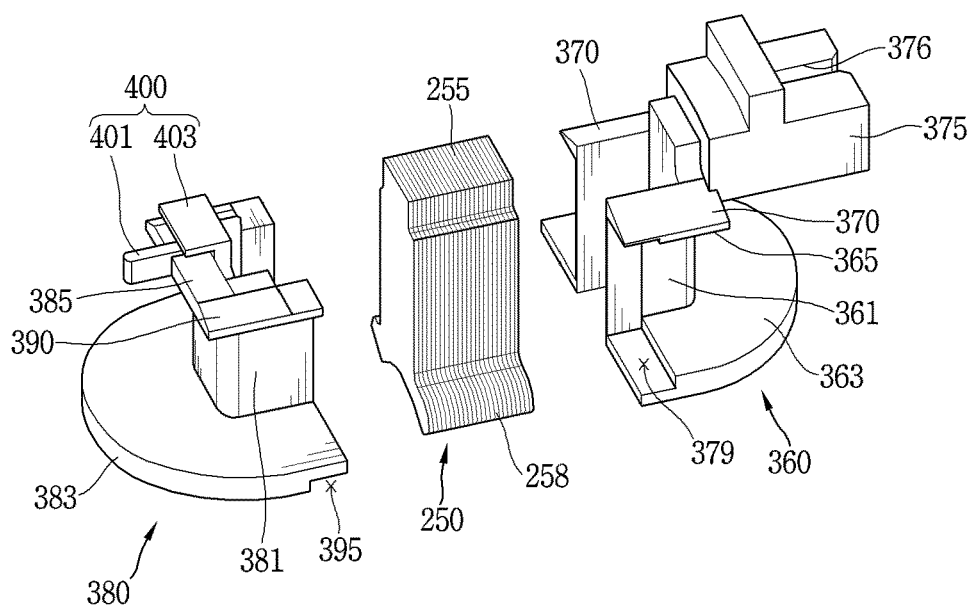
FIG. 8 is an exploded perspective view of the teeth and an teeth insulator each shown in FIG. 5.

FIG. 8 is an exploded perspective view of the teeth and the teeth insulator each shown in FIG. 5. As illustrated in FIG. 8, the teeth insulator 351 includes the first teeth insulator 360 and the second teeth insulator 380 coupled to each other along an axial direction to have the teeth 250 therebetween.

The first teeth insulator 360 and the second teeth insulator 380 are configured to overlap each other in an axial direction.

The first teeth insulator 360 includes a first cutout portion 379 obtained by performing cutout along a thickness direction to be disposed to overlap an inner side or an outer side of the second teeth insulator 380.

The second teeth insulator 380 includes a second cutout portion 395 obtained by performing cutout along a thickness direction to be disposed to overlap an inner side or an outer side of the first teeth insulator 360.

The first cutout portion 379 and the second cutout portion 395 are coupled to overlap each other in the thickness direction.

The first teeth insulator 360 includes a teeth insulating portion 361 for blocking one end (a right end in the drawing) and parts of both side surfaces of the teeth 250 along an axial direction.

The second teeth insulator 380 includes a teeth insulating portion 381 for blocking another end (a left end in the drawing) and parts of both side surfaces of the teeth 250 along an axial direction.

The first teeth insulator 360 and the second teeth insulator 380 are configured such that the coupling ends 255 of the teeth 250 and the shoes 258 of the teeth 250 are exposed to outside.

The first teeth insulator 360 and the second teeth insulator 380 include inner guides 363 and 383 disposed inside the phase coils 291 and outer guides 365 and 385 disposed outside the phase coils 291 along a radial direction of the stator 210, respectively.

The inner guides 363 and 383 may be implemented, for example, to respectively have an arcuate shape.

The outer guides 365 and 385 are respectively implemented, for example, to have a comparatively smaller size than that of the inner guides.

The outer guides 363 and 385 may be implemented, for example, to respectively have a rectangular section.

Meanwhile, the power line connection portions 375 connected to the power lines 293 of the phase coils 291, respectively, are disposed at one end of the teeth insulator 351.

In this implementation, the power line connection portions 375 are respectively included in the first teeth insulator 360.

The power line connection portions 375 are configured to protrude in an axial direction.

A cutout portion 376 obtained by performing cutout in an axial direction is disposed on one side of each of the power line connection portions 375.

A connection ring support portion 400 for supporting the connection ring 500 is respectively disposed at another end of the teeth insulator 351.

The connection ring support portions 400 are disposed on the second teeth insulator 380, respectively.

The connection ring support portions 400 include the internal support portion 401 disposed on an inner side of the connection line 500 and the external support portion 403 disposed outside the connection ring 500 along a radial direction.

The internal support portion 401 is configured, for example, to protrude from the outer guide 385 along an axial direction.

The external support portion 403 may be, for example, spaced apart from the outer guide 385 along a radial direction and protrude along an axial direction.

Figure 9:
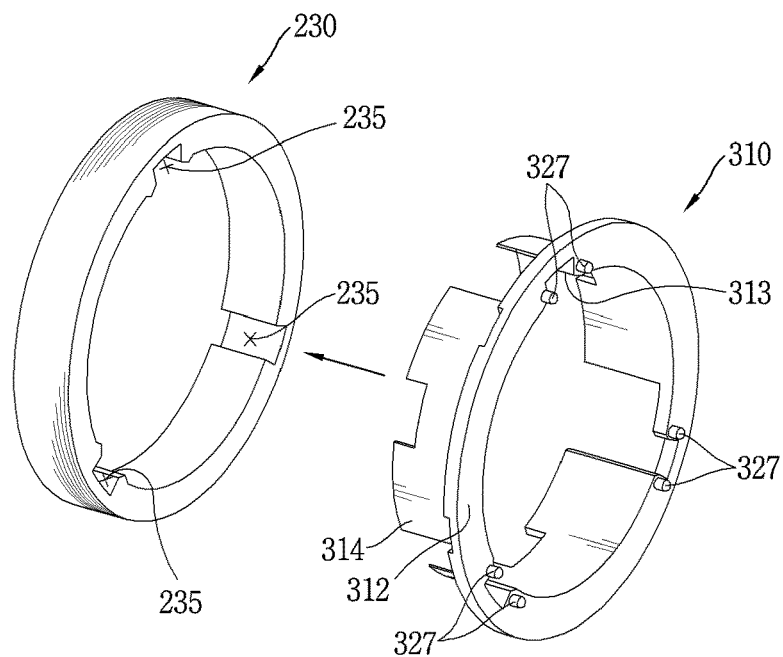
FIG. 9 is an exploded perspective view of the yoke and a first yoke insulator each shown in FIG. 5.

FIG. 9 is an exploded perspective view of the yoke and the first yoke insulator each shown in FIG. 5. As illustrated in FIG. 9, the end insulation portion 312 of the first yoke insulator 310 is configured to have such a radial width that an end of the yoke 230 may be blocked.

The yoke inner surface insulating portion 314 protrudes from an inner diameter of the end insulation portion 312 in an axial direction.

The yoke inner surface insulating portion 314 may be configured, for example, to have a length greater than an axial thickness (or a stack thickness) of the yoke 230.

For example, the yoke inner surface insulating portion 314 may include a protruding end 315 which protrudes toward another end of the yoke 230 when being coupled to the yoke 230. Here, the protruding end 315 refers to a portion (an end portion) of the yoke inner surface insulating portion 314 axially protruding from an opposite end of the stator core 220, The protruding end 315 of the yoke inner surface insulating portion 314 may be coupled to be disposed on an inner surface of the second yoke insulator 340.

The yoke inner surface insulating portion 314 is disposed at each of both sides of the teeth 250 along a circumferential direction.

A plurality of (three) yoke inner surface insulating portions 314 are implemented to be apart from each other in a circumferential direction.

The first yoke insulator 310 includes slots 313 penetrated therethrough to communicate with the teeth coupling portions 235.

The first yoke insulator 310 includes a position fixing projection 327 coupled to the teeth insulator 351.

The position fixing projection 327 is disposed on each of both sides of the slot 313.

The position fixing projections 327 respectively protrude in an axial direction.

Figure 10:
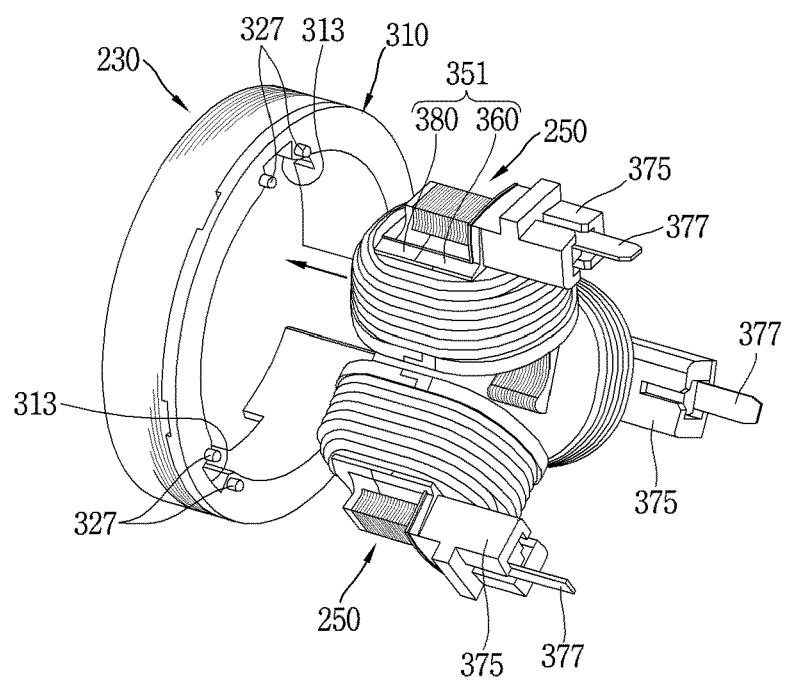
FIG. 10 is a diagram for explaining coupling between the yoke and the teeth each shown in FIG. 5.
Figure 11:
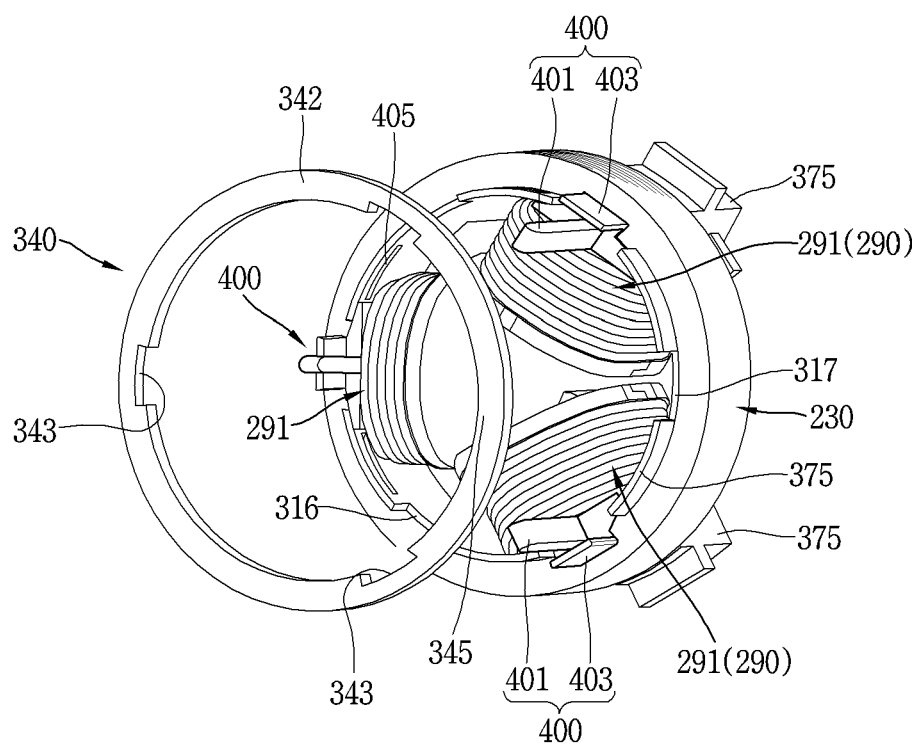
FIG. 11 is a diagram for explaining coupling between the yoke and a second yoke insulator each shown in FIG. 10.

FIG. 10 is a diagram for explaining coupling between the yoke and the teeth each shown in FIG. 5. FIG. 11 is a diagram for explaining coupling between the yoke and the second yoke insulator each shown in FIG. 10. As illustrated in FIG. 10, the first teeth insulator 360 and the second teeth insulator 380 are coupled to each other along an axial direction to have the plurality of teeth 250 therebetween.

The phase coils 291 are wound around the teeth insulation portions 361 and 381 of the teeth insulator 351 according to preset turns, respectively.

When the winding of the phase coils 291 are complete, the plurality of teeth 250 may be respectively coupled to the yoke 230 in an axial direction.

When the coupling ends 255 of the plurality of teeth 250 are respectively inserted into the respective teeth coupling portions 235 of the yoke 230, respective protruding ends 315 of the yoke inner surface insulating portions 314 protrude from an opposite end the yoke 230 in an axial direction, as illustrated in FIG. 11.

When the coupling of the plurality of teeth 250 is complete, the second yoke insulator 340 may be coupled to the opposite end of the yoke 230.

The second yoke insulator 340 is provided through the plurality of slots 343 to communicate with the teeth coupling portions 235 of the yoke 230, respectively.

Figure 12:
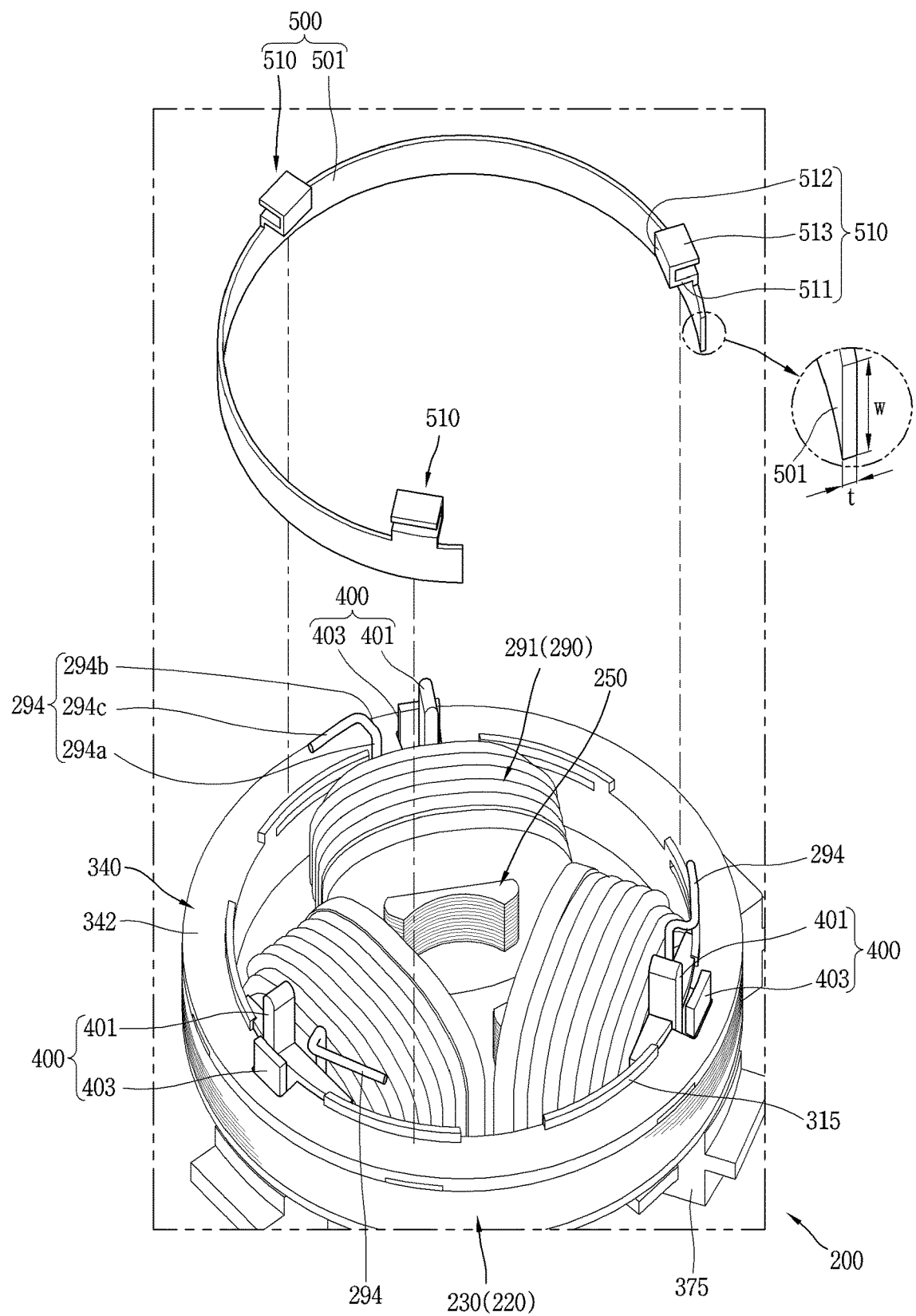
FIG. 12 is a perspective view of a state before coupling of the connection ring of FIG. 4.
Figure 13:
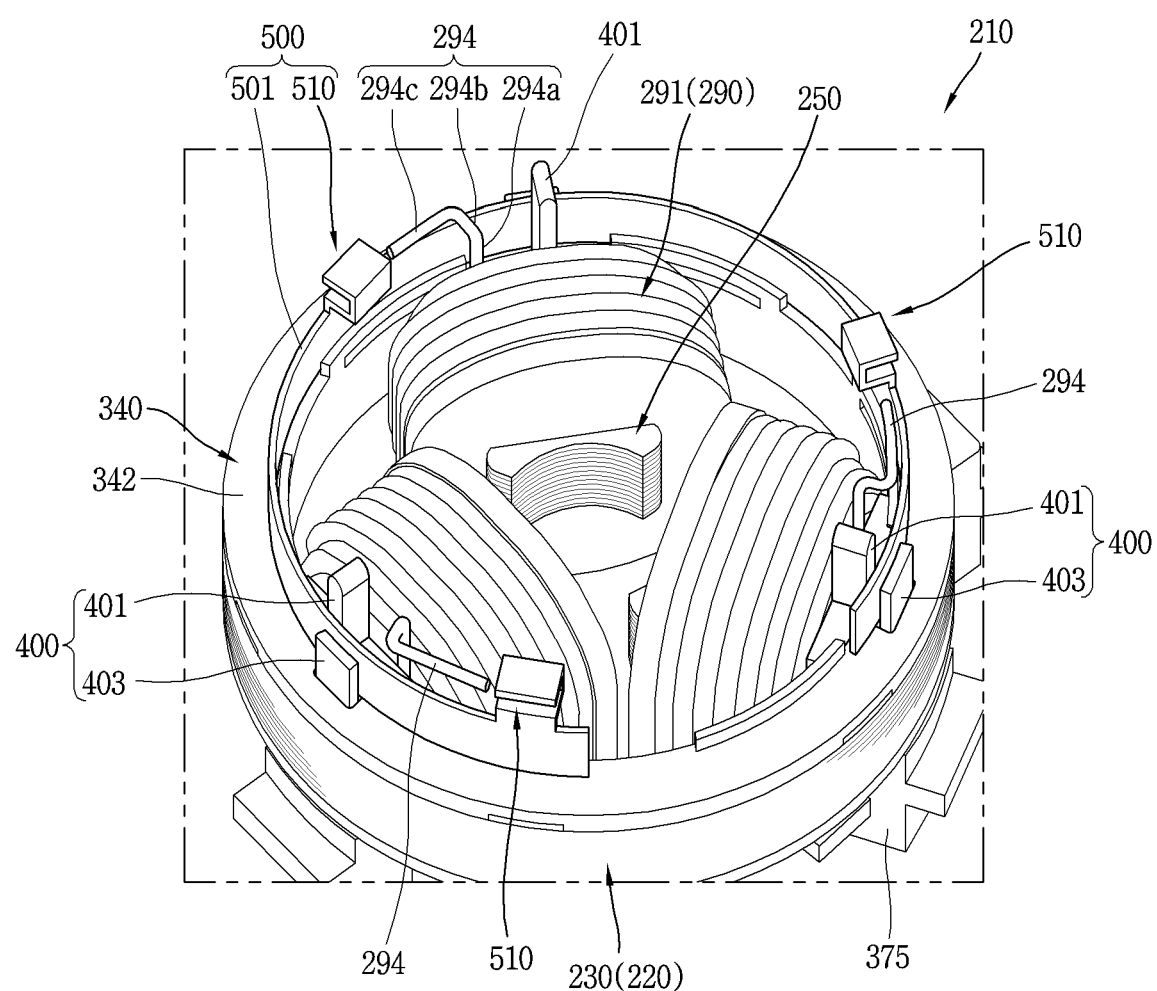
FIG. 13 is a diagram for explaining a coupling process of the connection ring of FIG. 12.
Figure 14:
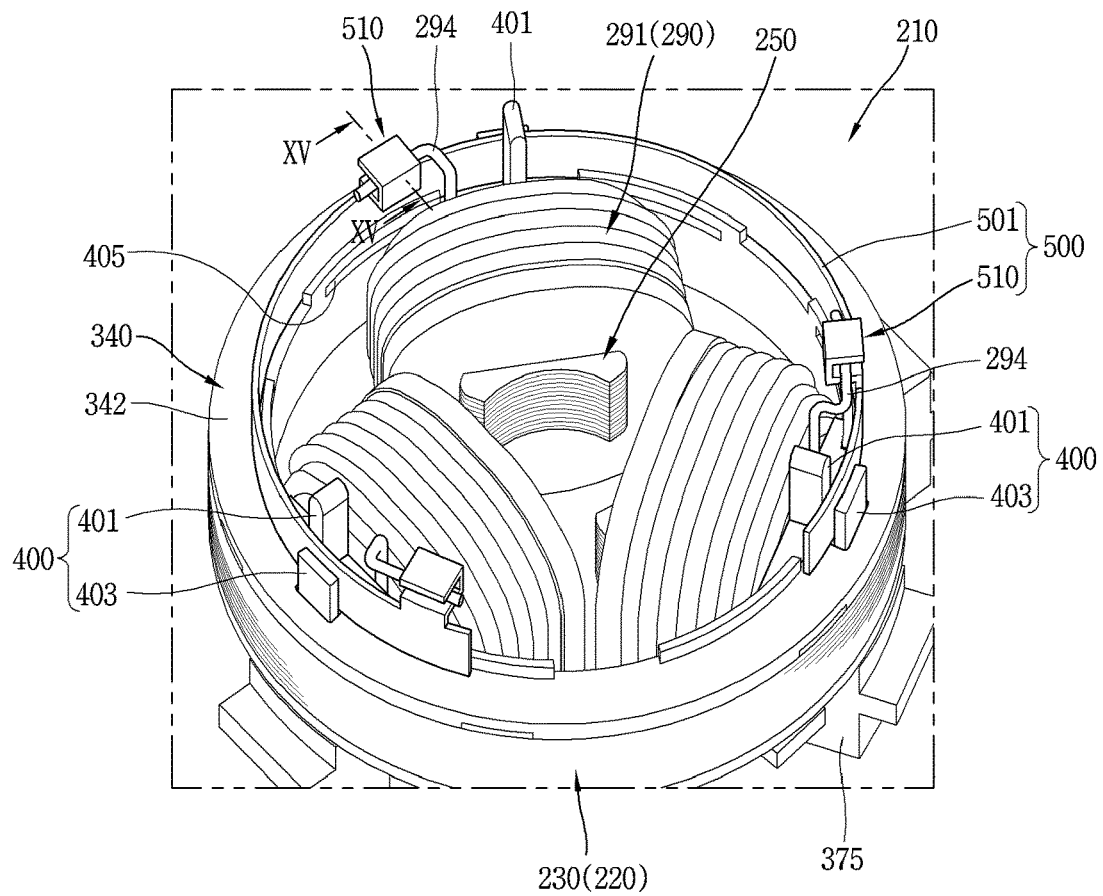
FIG. 14 is a diagram for explaining a state after coupling of the connection ring of FIG. 13.
Figure 15:
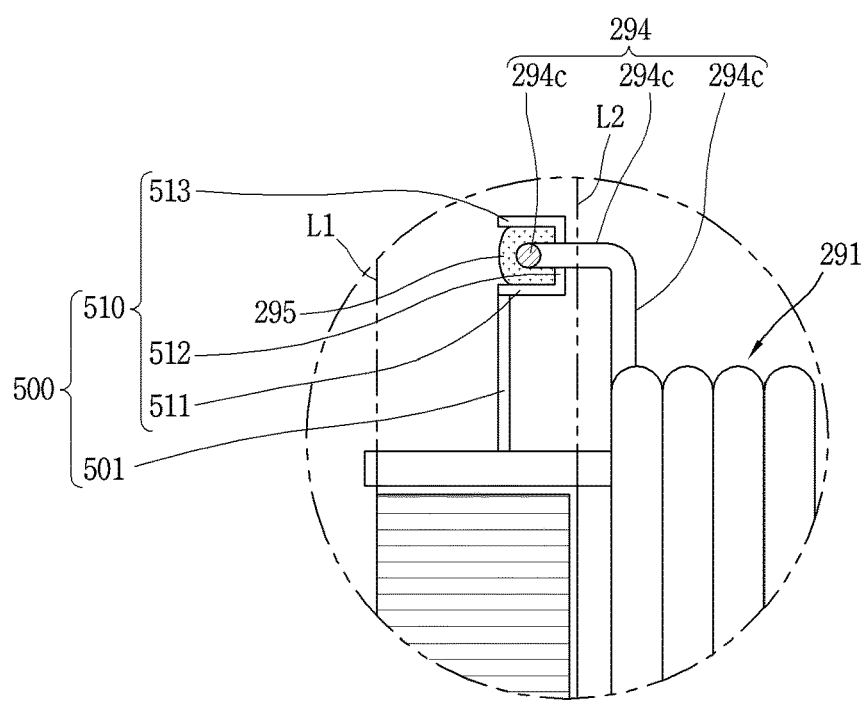
FIG. 15 is a sectional view of a region of a neutral line coupling portion of FIG. 14.

FIG. 12 is a perspective view of a state before coupling of the connection ring of FIG. 4. FIG. 13 is a diagram for explaining a coupling process of the connection ring of FIG. 12. FIG. 14 is a diagram for explaining a state after coupling of the connection ring of FIG. 13. FIG. 15 is a sectional view of a region of a neutral line coupling portion of FIG. 14. As illustrated in FIG. 12, the connection ring support portions 400 on the teeth insulator 351 respectively protrude from the second teeth insulator 380.

When the connection ring 500 is to be coupled to the connection ring support portions 400, the connection ring 500 is spaced apart from one sides (upper sides in the drawing) of the connection ring support portions 400 in an axial direction.

When the connection ring 500 is coupled to the connection ring support portions 400 in an axial direction, each of the neutral line connection portions 510 is disposed to correspond to a point apart from an end of a corresponding neutral line 294 along a circumferential direction so that the respective neutral line connection portions 510 and the respective neutral lines 294 do not interfere with each other.

Then, as illustrated in FIG. 13, the body 501 of the connection ring 500 is inserted between the internal support portion 401 and the external support portion 403 of the connection ring support portion 400.

The neutral line connection portions 510 are disposed at positions spaced apart from ends of the neutral lines 294, respectively, along a circumferential direction.

In this configuration, when the body 501 of the connection ring 500 is inserted between the internal support portion 401 and the external support portion 403 of the connection ring support portion 400, an interference between the respective neutral lines 294 and the respective neutral line connection portions 510 may be prevented.

When the body 501 of the connection ring 500 is inserted into the connection ring support portions 400, the connection ring 500 is rotated along a circumferential direction of the stator core 220 so that each of the neutral lines 294 may be inserted into a corresponding line connection portion 510, as illustrated in FIG. 13.

As illustrated in FIG. 14, ends of the neutral lines 294 may, for example, protrude toward an opposite side of a corresponding neutral line connection portion 510 via inside the corresponding neutral line connection portion 510.

A neutral line 294 inserted into the neutral line connection portion 510 may be integrally fixed and coupled to the corresponding neutral line connection portion 510.

In each of the neutral line connection portions 510, a soldering portion 295 fixed by soldering the neutral line 294 and the neutral line connection portion 510 may be disposed, respectively.

As illustrated in FIG. 15, in this implementation, the body 501 of the connection ring 500 is disposed between an extension line (the first extension line L1) axially extending from an outer diameter surface of the stator core 220 and an extension line (a second extension line L2) axially extending from an inner diameter surface of the stator core 220.

In addition, the neutral line connection portion 510 is disposed on an inner side with reference to the first extension line L1 along a radial direction of the stator core 220.

The second section 294b and the third section 294c of the neutral line 294 are disposed between the first extension line L1 and the second extension line L2.

By doing so, connection between the neutral line 294 and the neutral line connection portion may be performed on an inner side with reference to the first extension line L1.

According to this configuration, in the motor assembly 100 in this implementation, when the neutral lines 294 and the neutral line connection portions 510 are connected to each other, an enlargement of an outer shape (a size) of the stator 210 in a radial direction to ensure an insulation distance may be suppressed. Thus, the motor assembly 100 having a small size may be implemented.

Figure 16:
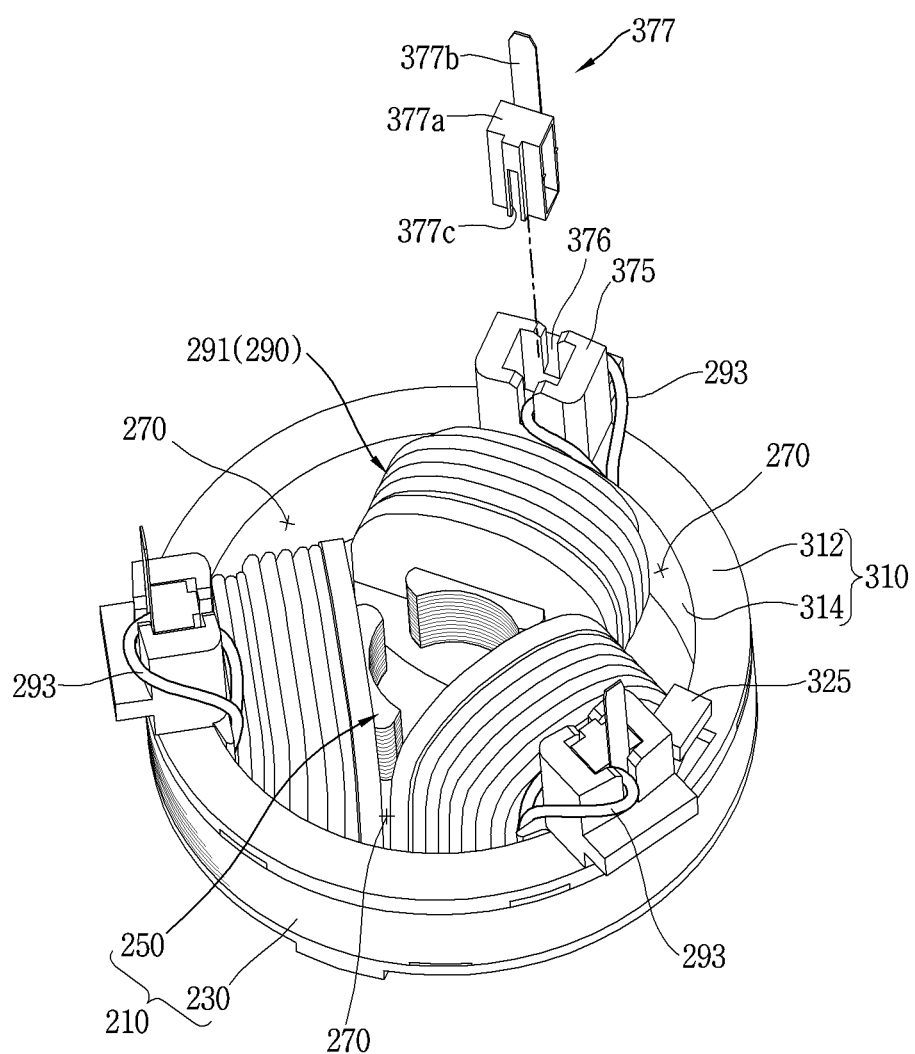
FIG. 16 is a diagram for explaining coupling between a power line connection portion and a printed circuit board (PCB) connection terminal both included in the stator of FIG. 3.

FIG. 16 is a diagram for explaining coupling between the power line connection portion and a PCB connection terminal both included in the stator of FIG. 3. As illustrated in FIG. 16, the insulator 300 includes the power line connection portions 375 connected to the power lines 293 of the phase coils 291.

The power line connection portions 375 are respectively disposed in the teeth insulators 351 (the first teeth insulator 360).

The power line connection portions 375 include cutout portions 376 into which the power lines 293 of the phase coils 291 is to be inserted. The cutout portions 376 are obtained by performing cutout from ends of the power line connection portions 375 in an axial direction.

The power line connection portions 375 respectively include the PCB connection terminal 377 having one side connected to the power lines 293 and another side connected to the PCB 490.

The PCB connection terminal 377 may be configured to include, for example, a body 377a inserted into the power connection portions 375 and a connecting piece 377b protruding from the body 377a to be connected to the PCB 490.

The body 377a of the PCB connection terminal 377 may include a slit 377c obtained by performing cut out so that each of the power lines 293 are inserted therein.

Here, the slit 377c may be, for example, configured to have such a size that the power line 293 is press-fit into the slit 377c when the power line 293 is inserted therein. Although not illustrated in detail in the drawing, the power line 293 includes a conductor and a coating film covered on a surface of the conductor. When the power line 293 is inserted into the slit 377c, as the coating film applied to the surface of the conductor of the power line 293 is stripped off, the conductor of the power line 293 is brought into direct contact with a conductor of the PCB connection terminal 377 to get into an electrically connectible state (a state in which current may flow).

According to this configuration, the power line 293 of the phase coils 291 may be coupled to each of the power line connection portions 375, respectively, and the PCB connection terminal 377 may be coupled into each of the power line connection portions 375.

In a state when each of the power lines 293 of the phase coils 291 is inserted into the cutout portion 376 of the power line connection portions 375, when the PCB connection terminal 377 is inserted into the power line connection portion 375, the power line 293 may be inserted into the slit 377c in the body 377a of the PCB connection terminal 377.

By doing so, the power line 293 may be electrically connected to the PCB connection terminal 377.

As described above, when the power line 293 is connected to one end of the stator 210 and the connection ring 500 is connected to another end of the stator 210 to thereby connect the connection ring 500 to each of the neutral lines 294, the stator 210 may be coupled into the housing 110.

Figure 17:
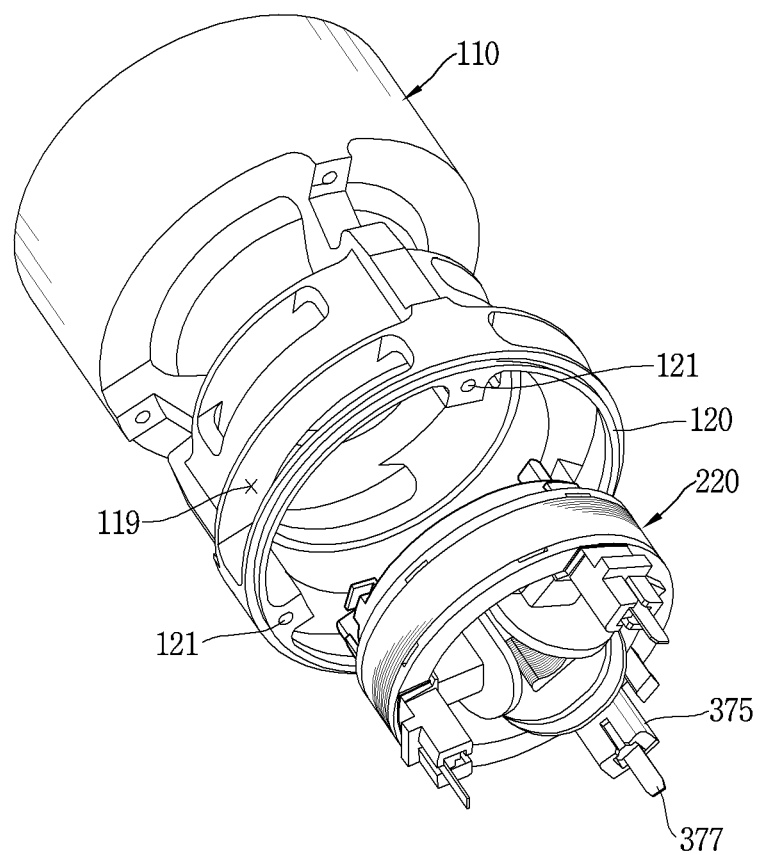
FIG. 17 is a diagram for explaining coupling between a housing and the stator each shown in FIG. 2.
Figure 18:
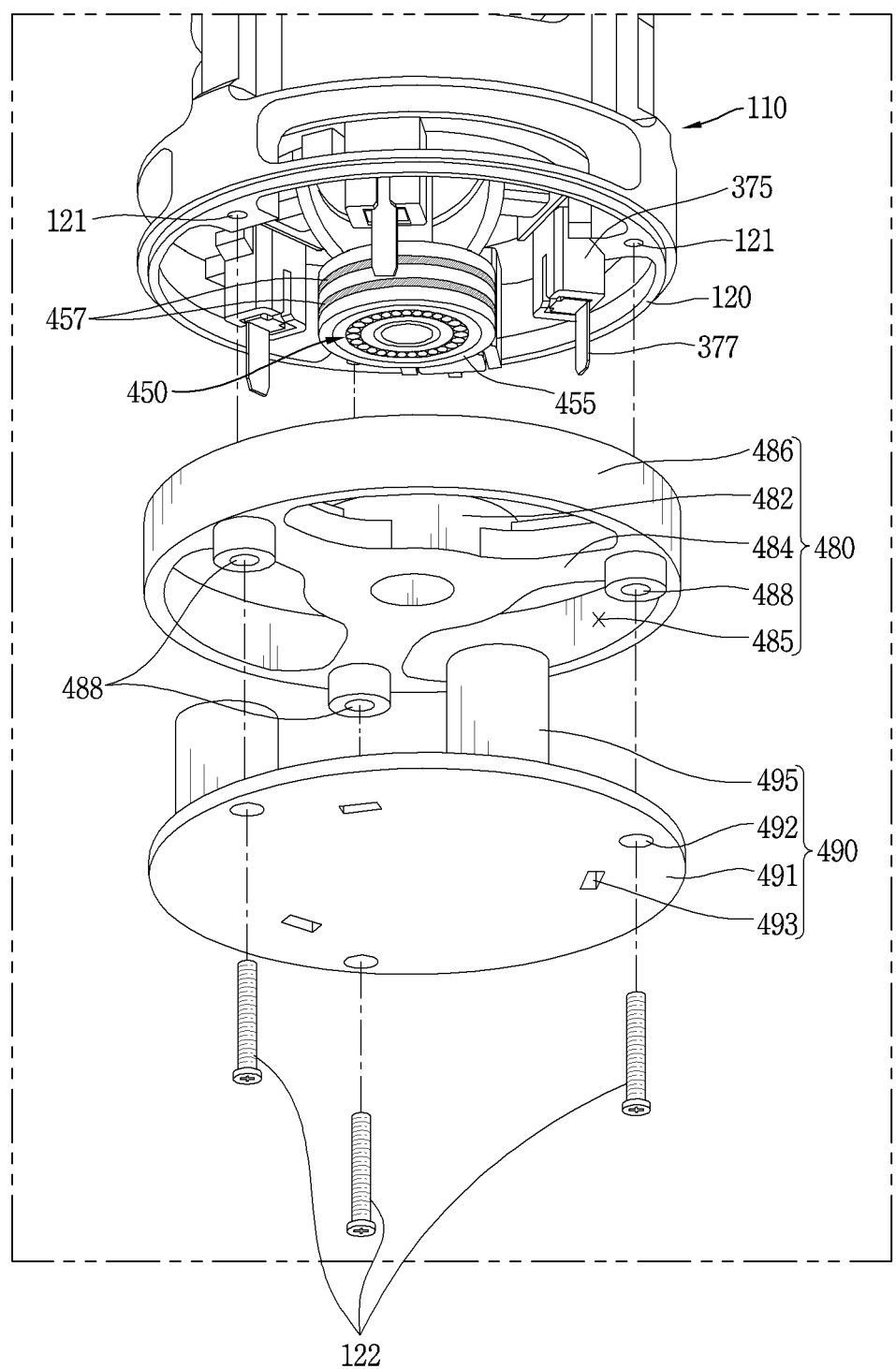
FIG. 18 is a diagram for explaining coupling between the housing, a bracket, and a PCB each shown in FIG. 2.

FIG. 17 is a diagram for explaining coupling between the housing and the stator each shown in FIG. 2. FIG. 18 is a diagram for explaining coupling between the housing, the bracket, and the PCB each shown in FIG. 2. As illustrated in FIG. 17, a through hole 119 is provided through a circumferential surface of the housing 110 such that air may flow into the housing 110 through a side surface of the housing 110.

A fixing member coupling portion 121 is disposed at one end of the housing 110 (a lower end in the drawing) such that the bracket 480 and the PCB 490 may be coupled to the fixing member 122.

Although not illustrated in the drawing in detail, the fixing member coupling portion 121 includes a female screw portion to be screwed to a male screw portion of the fixing member 122.

The stator 210 may be coupled into one end of the housing 110 (a lower end in the drawing).

The stator 210 may be axially disposed at a front end of the connection ring 500 in an insertion direction to be coupled into the stator accommodation portion 112 of the housing 110.

When the stator 210 is inserted into the housing 110, the stator 210 may be fixed to be integrally coupled to the housing 110.

As illustrated in FIG. 18, when the stator 210 is inserted into the stator accommodation portion 112 of the housing 110, the rotor 420 may be coupled into the stator 210.

The bearing 450 is coupled respectively to an upper end and a lower end of the rotating shaft 430.

The holder 455 is disposed outside the bearing 450, and the sealing member 457 is disposed on an outer surface of the holder 455.

The bracket 480 is coupled to a lower end of the housing 110.

The bearing 456 is accommodated to be coupled into the bearing accommodation portion 482 of the bracket 480.

The PCB 490 is coupled to one side of the bracket 480 (a lower side in the drawing) along an axial direction.

A fixing member coupling portion 488 is included in the bracket 480 to be coupled to the fixing member 122 coupled to the fixing member coupling portion 121 of the housing 110.

The fixing member coupling portion 488 of the bracket 480 may be, for example, disposed in the spoke portion 484.

The fixing member coupling portion 488 of the bracket 480 may be configured to protrude from the rim portion 486 and the spoke portion 484 along an axial direction. The fixing member coupling portion 488 may be coupled to be in contact with the PCB 490.

In this configuration, the PCB 490 may be coupled to the rim portion 486 and the spoke portion 484 each included in the bracket 480 to be apart therefrom by a preset distance. By doing so, air may be introduced between the rim portion 486 of the bracket 480 and the substrate 491 of the PCB 490.

The substrate 491 of the PCB 490 is provided through a fixing member insertion hole 492 such that the fixing member 122 is inserted into the substrate 491.

The substrate 491 of the PCB 490 may be provided respectively through PCB connection terminal insertion portions 493 such that an end of the connection piece 377b of the PCB connection terminal 377 is inserted therein.

In this configuration, the fixing member coupling portion 121 of the housing 110, the fixing member coupling portion 488 of the bracket 480, and the fixing member insertion hole 492 in the PCB 490 are disposed to communicate with each other in an axial direction. Then, the fixing member 122 is inserted into the fixing member insertion hole 492.

The fixing member 122 sequentially passes through the fixing member insertion hole 492 and the fixing member coupling portion 488 communicating with each other, and then, is coupled to the fixing member coupling portion 121 of the housing 110.

When the fixing member 122 is screwed to the housing 110, an end of the connection piece 377b of the PCB connection terminal 377 is inserted respectively into the PCB connection terminal insertion portions 493 of the substrate 491. The PCB connection terminal 377 may be fixed to the PCB 490 by soldering.

The motor assembly 100 in this implementation is configured such that the power lines 293 of the stator coil 290 extend to be connected to one side end of the stator 210, and the neutral lines 294 of the stator coil 290 extend to be connected to another side end of the stator 210. Thus, an insulation distance between the power lines 293 and the neutral lines 294 may be easily ensured.

In addition, since the connection ring 500 of the motor assembly 100 in this implementation is plastically deformed in an arcuate shape so that a thickness t of an electric conductor having a long plate shape is positioned in a radial direction of the stator 210, the plastic deformation occurs in a relatively small thickness direction. Thus, as comparatively small force is exerted during the plastic deformation, the connection ring 500 may be easily manufactured.

In addition, the connection ring 500 of the motor assembly 100 in this implementation is configured such that a width w of the body 501 of the connection ring 500 is axially disposed between an outer diameter and an inner diameter of the stator 210 along a radial direction of the stator 210. Thus, a contact with air moved by the impeller 130 is suppressed to thereby prevent an increase in flow resistance of the air remarkably.

Figure 19:
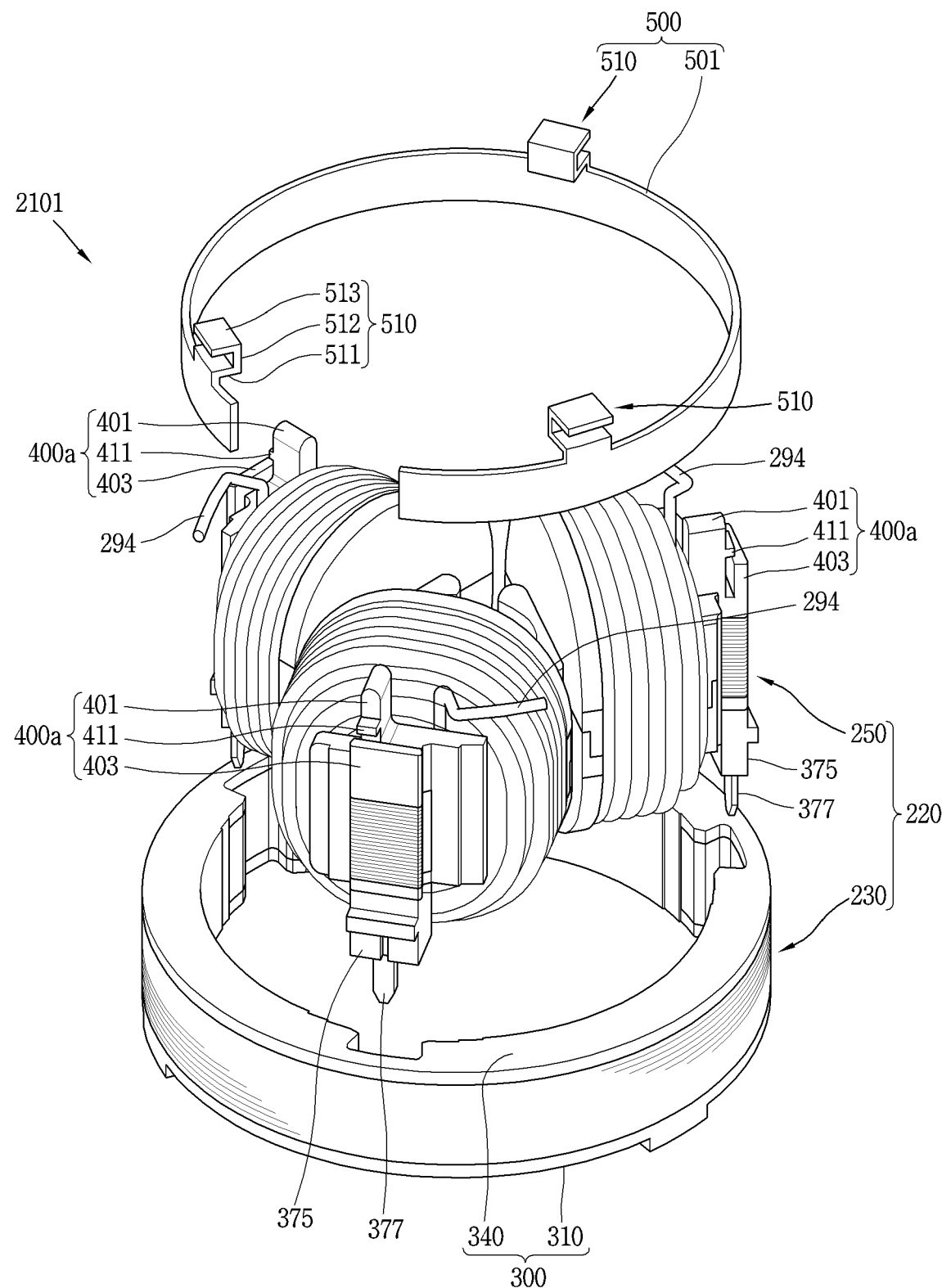
FIG. 19 is a perspective view of a state before coupling of a connection ring and teeth both included in a motor assembly in accordance with another implementation of the present disclosure.
Figure 20:
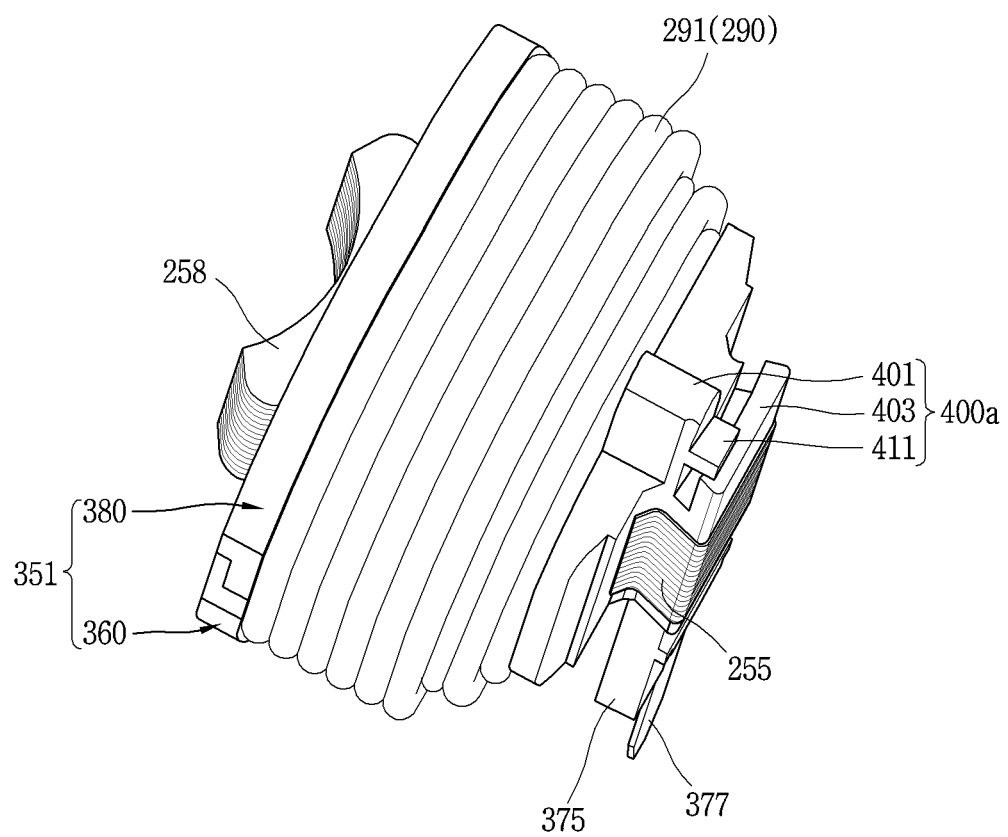
FIG. 20 is a diagram of a connection ring support portion of FIG. 19.
Figure 21:
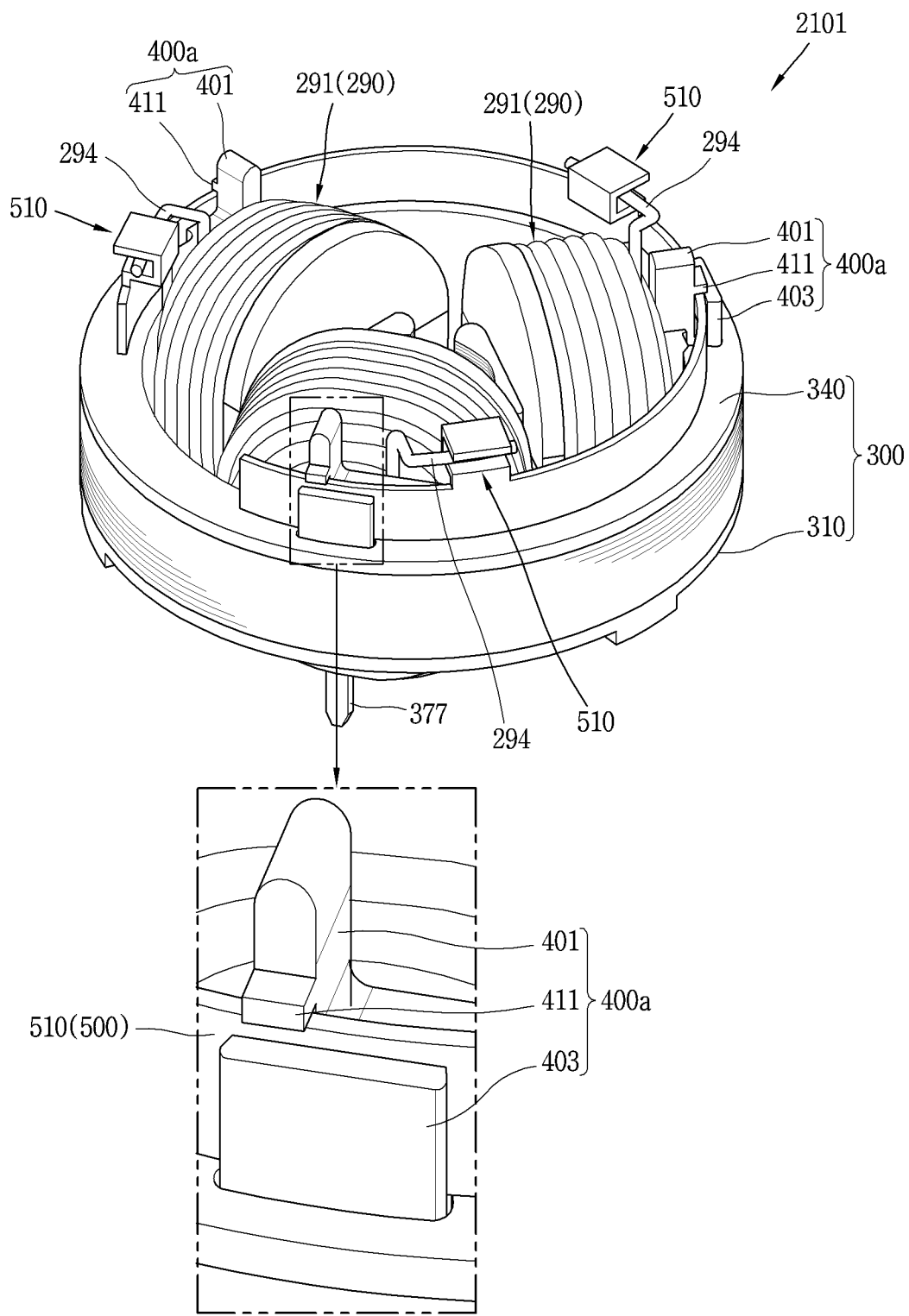
FIG. 21 is a perspective view of a state after coupling of the connection ring of FIG. 19.

FIG. 19 is a perspective view of a state before coupling of a connection ring and teeth both included in a motor assembly in accordance with another implementation of the present disclosure. FIG. 20 is a diagram illustrating a connection ring support portion of FIG. 19. FIG. 21 is a perspective view of a state after coupling of the connection ring of FIG. 19. As illustrated in FIG. 19, the motor assembly 100 in this implementation includes a stator 2101, the rotor 420, and the connection ring 500.

As illustrated in FIG. 19, the stator 2101, for example, includes the stator core 220, the stator coil 290 wound on the stator core 220, and the insulator 300 insulating the stator core 220 from the stator coil 290.

The stator core 220 is configured, for example, to include the yoke 230 and the plurality of teeth 250 coupled to the yoke 230.

The stator coil 290 may include, for example, the plurality of phase coils 291 connected to each phase (a u-phase, a v-phase, a w-phase) of a three-phase AC power source.

Each of the power lines 293 of the phase coils 291 axially extends to one end of the stator core 220 (a lower end in the drawing).

Each of the neutral lines 294 of the phase coils 291 axially extends to another end of the stator core 220 (an upper end in the drawing).

For example, the neutral lines 294 respectively include the first section 294a disposed in an axial direction, the second section 294b bent from the first section 294a, the third section 294c bent from the second section 294b to be disposed in a circumferential direction.

The insulator 300, for example, includes the yoke insulator 301 for insulating the yoke 230 and the teeth insulator 351 for insulating the teeth 250.

The yoke insulator 301 includes the first yoke insulator 310 and the second yoke insulator 340 coupled to each other in an axial direction.

The teeth insulator 351, for example, includes the first teeth insulator 360 and the second teeth insulator 380 coupled to each other in an axial direction.

The stator 2101 is made of an electric conductor, and includes the connection ring 500 disposed at the other end of the stator core 220 and simultaneously connecting the neutral lines 294 of the phase coils 291.

The connection ring 500 includes the body 501 disposed along a circumferential direction of the stator core 220, and the plurality of neutral line connection portions 510 protruding from the body 501 and connected to the neutral lines 294, respectively.

Here, the neutral lines 294 and the connection ring 500 (the neutral connection portions 510) may be disposed on an inner side with reference to an extension line (the first extension line L1) axially extending from an outer diameter surface of the stator core 220.

By doing so, the neutral lines 294 and the neutral line connection portions 510 may be connected to each other inside the outer diameter surface of the stator core 220. Thus, an enlargement of an outer shape (a size) of the stator core 220 to ensure an insulation distance between the neutral lines 294 and the neutral line connection portions 510 may be suppressed.

The plurality of neutral line connection portions 510 are configured to open at both side along a circumferential direction of the stator 2101, and also respectively include a groove shape open outwardly along a radial direction of the stator 2101.

Each of the plurality of neutral line connection portions 510 axially includes a first radial direction section 511 inwardly protruding from one end of the body 501 along a radial direction, an axial direction section 512 axially protruding from the first radial direction section 511, and a second radial direction section 513 outwardly protruding from the axial direction section 512 along a radial direction.

Here, the first radial direction section 511 is disposed on one side (a lower side in the drawing) of the neutral lines 294 in an axial direction.

The second radial direction section 513 is disposed on another side of the neutral lines 294 (an upper side in the drawing) in an axial direction.

Meanwhile, a connection ring support portion 400a for supporting the connection ring 500 is included in the stator 2101 (the insulator 300).

The connection ring support portion 400a includes the internal support portion 401 included inside the body 501 and the external support portion 403 disposed outside the body 501 along a radial direction of the stator 2101.

The internal support portion 401 includes a separation prevention projection 411 protruding toward outside along a radial direction of the stator 2101 to be in contact with one side of the connection ring 500 (an upper end in the drawing) along an axial direction.

As illustrated in FIG. 20, the separation prevention projection 411 is spaced apart from the external support portion 403 in an axial direction.

By doing so, after the connection ring 500 is coupled to the connection ring support portion 400a, as illustrated in FIG. 21, radial clearance of both plate surfaces of the body 501 of the connection ring 500 may be suppressed by the internal support portion 401 and the external support portion 403, and axial clearance thereof may be suppressed by the yoke insulator 301 (the end insulation portion 342 of the second yoke insulator 340) and the separation prevention projection 411.

Figure 22:
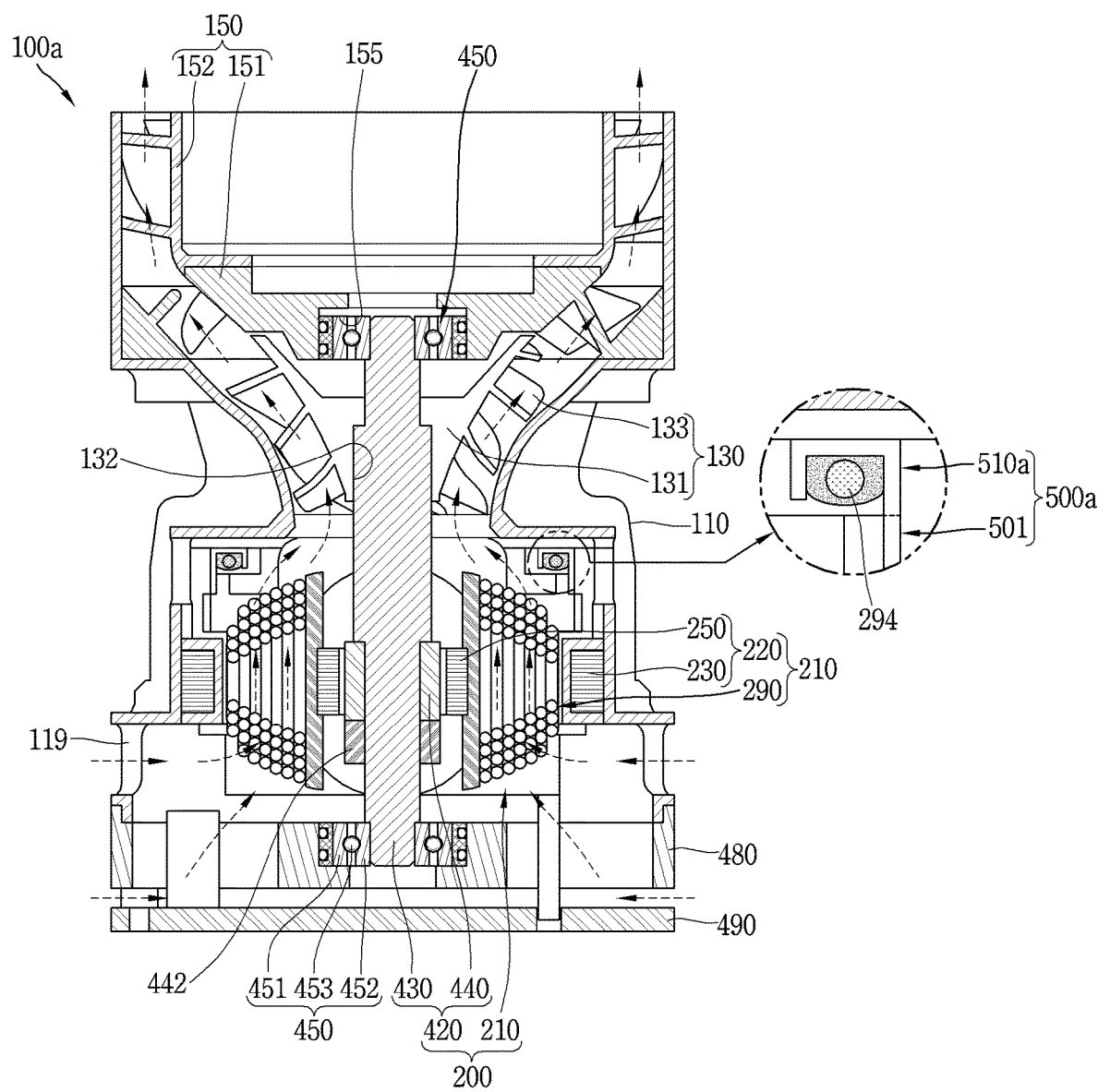
FIG. 22 is a sectional view of the motor assembly in accordance with another implementation of the present disclosure.

FIG. 22 is a sectional view of a motor assembly in accordance with another implementation of the present disclosure. As illustrated in FIG. 22, a motor assembly 100a according to this implementation includes a stator 210a, the rotor 420, and a connection ring 500a.

The motor assembly 100a in this implementation includes the housing 110 for accommodating the stator 210a therein.

The housing 110, for example, defines an accommodation space with both ends open in an axial direction.

The impeller 130 is included in the housing 110.

The vane 150 is disposed on one side (an upper side in the drawing) of the impeller 130 in the housing 110.

The vane 150, for example, includes the first vane 151 and the second vane 152 coupled to each other in an axial direction.

The stator 210a, for example, includes the stator core 220, the stator coil 290 wound on the stator core 220, and the insulator 300 for insulating the stator coil 290.

The stator core 220 includes the yoke 230 and the plurality of teeth 250 coupled to the yoke 230.

The stator coil 290 may include the plurality of phase coils 291 connected to each phase (a u-phase, a v-phase, a w-phase) of a three-phase AC power source.

In this implementation, each of the power lines 293 of the phase coils 291 may axially extend to one end of the stator core 220 (a lower end in the drawing), and each of the neutral lines 294 of the phase coils 291 may axially extend to another end of the stator core 220 (an upper end in the drawing).

The connection ring 500a connecting the neutral lines 294 of the stator coil 290 is disposed in the stator 210a.

The phase coils 291 are electrically connected (Y-connected) to each other integrally by the connection ring 500a.

The rotor 420 includes the rotating shaft 430 and the permanent magnet 440 configured to rotate with reference to the rotating shaft 430.

The rotating shaft 430 extend toward each of both sides of the permanent magnet 440 (upper and lower sides in the drawing).

Both ends of the rotating shaft 430 may be rotatably supported by bearings 450.

The bearings 450 are configured to include the outer ring 451, the inner ring 452 concentrically disposed on an inner side of the outer ring 451, and the plurality of balls 453 disposed between the outer ring 451 and the inner ring 452.

The bearings 450 are accommodated in the holder 455.

The sealing member 457 is positioned on an outer surface of the holder 455.

The sealing member 457 is implemented, for example, as an O-ring made of a rubber material.

One of the bearings 450 (an upper side in the drawing) is included in the first vane 151.

The other of the bearings 450 (a lower side in the drawing) is accommodated in the bracket 480.

The bracket 480 is coupled to a lower end of the housing 110.

The PCB 490 is disposed at one side of the bracket 480 (a lower side in the drawing).

The PCB 490 and the bracket 480 are, for example, integrally coupled to the housing 110 by the fixing member 122.

Figure 23:
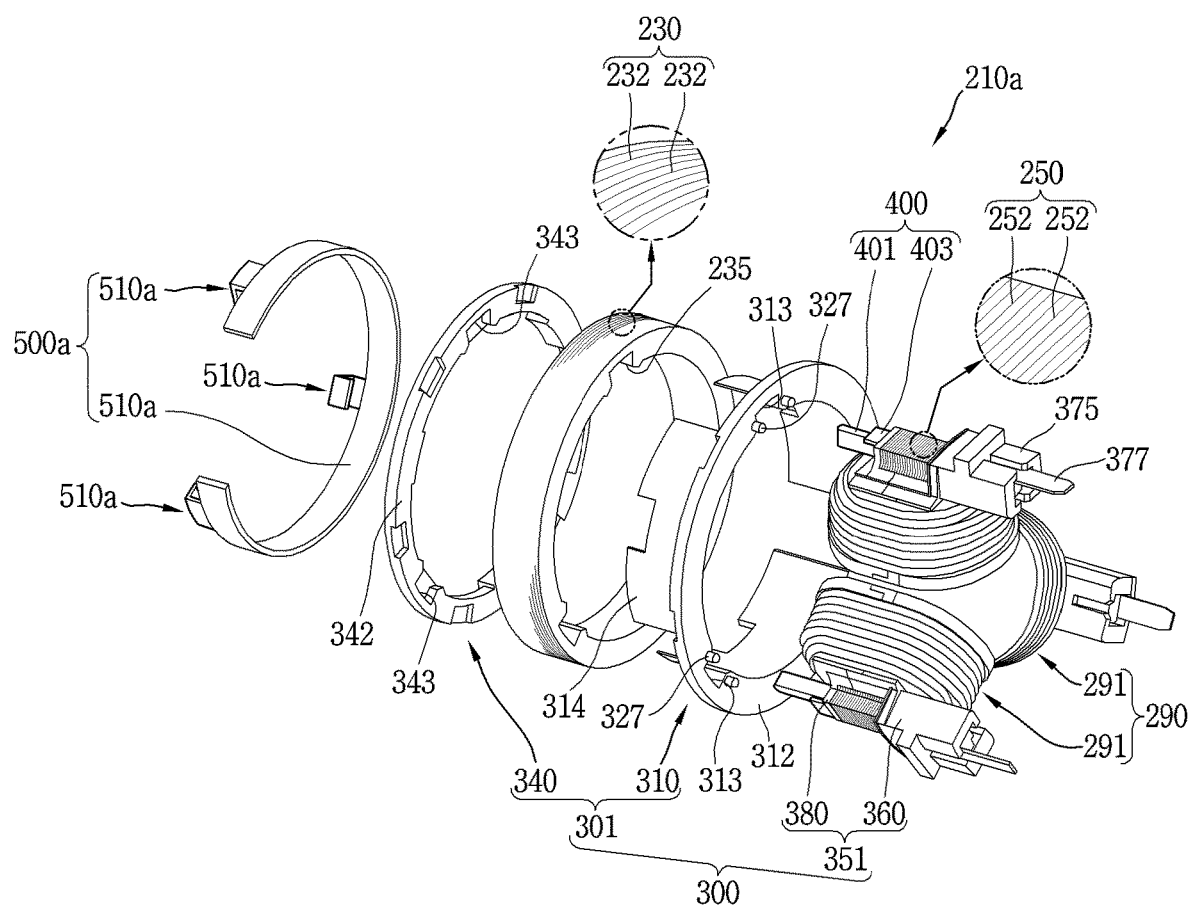
FIG. 23 is an exploded perspective view of a stator of FIG. 22.

FIG. 23 is an exploded perspective view of the stator of FIG. 22. As illustrated in FIG. 23, the stator core 220 includes the yoke 230 and the plurality of teeth 250.

The yoke 230 may be implemented to have a circular ring shape (an annular shape).

The plurality of teeth coupling portions 235 are disposed on an inner surface of the yoke 230 to be coupled to the plurality of teeth 250, respectively. The teeth coupling portions 235 are provided therethrough in an axial direction. The teeth coupling portions 235 are disposed to be inwardly open along a radial direction.

The insulator 300 includes the yoke insulator 301 for insulating the yoke 230.

The yoke insulator 301 includes the first yoke insulator 310 and the second yoke insulator 340 coupled to each other in an axial direction to have the yoke 230 therebetween.

The first yoke insulator 310 includes the end insulating portion 312 for blocking (insulating) an end of the yoke 230, and the yoke inner surface insulating portion 314 for insulating an inner surface of the yoke 230.

The second yoke insulator 340 includes the end insulating portion 342 for blocking (insulating) an end of the yoke 230.

The teeth insulator 351 may include the first teeth insulator 360 and the second teeth insulator 380 coupled to each other along an axial direction to have the teeth 250 therebetween.

The power line connection portions 375 connected to the power lines 293 of the phase coils 291 are disposed in the first teeth insulator 360. The power line connection portions 375 respectively include the PCB connection terminal 377 having one side connected to the power line 293 and another side connected to the PCB 490.

Meanwhile, the connection ring support portion 400 supporting the connection ring 500a is included in the insulator 300 (the second teeth insulator 380).

The connection ring support portion 400 includes, for example, the internal support portion 401 included inside the body 501 and the external support portion 403 disposed outside the body 501 along a radial direction of the stator 210a.

The connection ring 500a is configured to include the body 501 disposed along a circumferential direction of the stator core 220, and the plurality of neutral line connection portions 510a protruding from the body 501 and connected to the neutral lines 294, respectively.

Here, the body 501 has a long plate shape having a length greater than a width w.

In detail, the body 501 is configured to be plastically deformed to have an arcuate shape with one side open along a circumferential direction so that a thickness t is disposed in a radial direction of the stator 210a.

Figure 24:
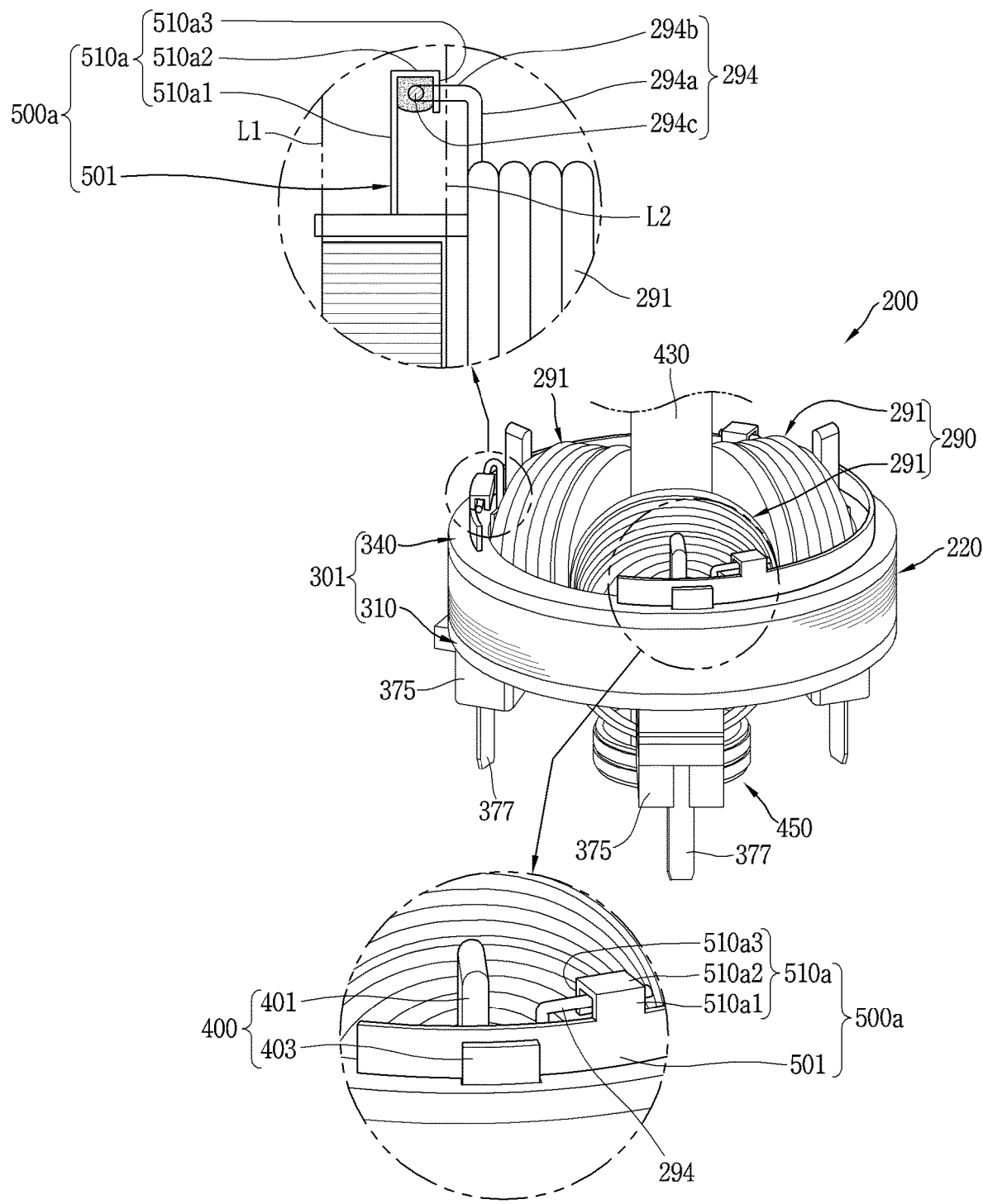
FIG. 24 is a perspective view of a coupling state of the stator of FIG. 23.

FIG. 24 is a perspective view of a coupling state of the stator of FIG. 23 As illustrated in FIG. 24, the neutral lines 294 include the first section 294a disposed in an axial direction, the second section 294b bent from the first section 294a, and the third section 294c bent from the second section 294b to be disposed in a circumferential direction.

In addition, the neutral lines 294 are disposed on an inner side with reference to an extension line (the first extension line L1) axially extending from an outer diameter surface of the stator core 220.

In detail, the first section 294a of the neutral lines 294 is disposed on an inner side with reference to an extension line (the second extension line L2) axially extending from an inner diameter surface of the stator core 220, and the second section 294b of the neutral lines 294 protrudes toward an outer side with reference to the second extension line L2. The third section 294c is disposed between the first extension line L1 and the second extension line L2.

The third section 294c of each of the neutral lines 294 is inserted into each of neutral line connection portions 510a of the connection ring 500a.

The neutral line connection portions 510a respectively include a groove shape open toward both sides along a circumferential direction of the stator 210a, as well as being open toward the stator core 220.

The neutral line connection portions 510a axially includes a first axial direction section 510a1 protruding from one end of the body 501 along an axial direction, a radial direction section 510a2 protruding from the first axial direction section 510a1 in a radial direction, and a second axial direction section 510a3 protruding from the radial direction section 510a2 in an axial direction.

The first axial direction section 510a1 is disposed outside the neutral lines 294 along a radial direction of the stator 210.

The second axial direction section 510a1 is disposed inside the neutral lines 294 along a radial direction of the stator 210.

Here, the connection ring 500a (the neutral line connection portions 510a) may be disposed, for example, on an inner side with reference to an extension line (the first extension line L1) axially extending from an outer diameter surface of the stator core 220.

By doing so, the connection ring 500a is connected to the neutral lines 294 on an inner side with reference to an extension line (the first extension line L1) axially extending from an outer diameter surface of the stator core 220. Thus, a radial increase in a size of the stator 210a to ensure an insulation distance for connection of the neutral lines 294 may be suppressed.

Figure 25:
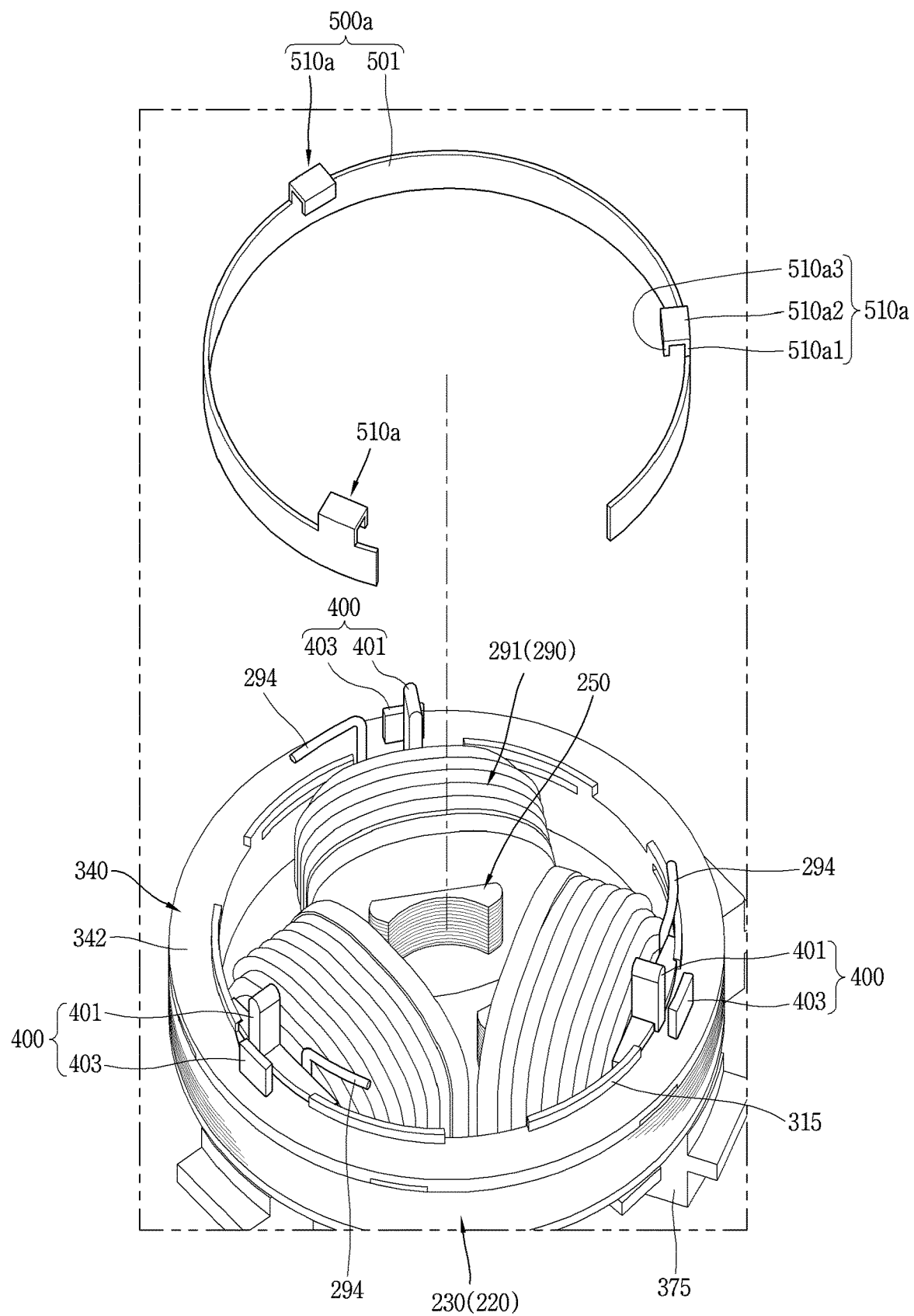
FIG. 25 is a diagram for explaining a coupling state of a connection ring of FIG. 24.
Figure 26:
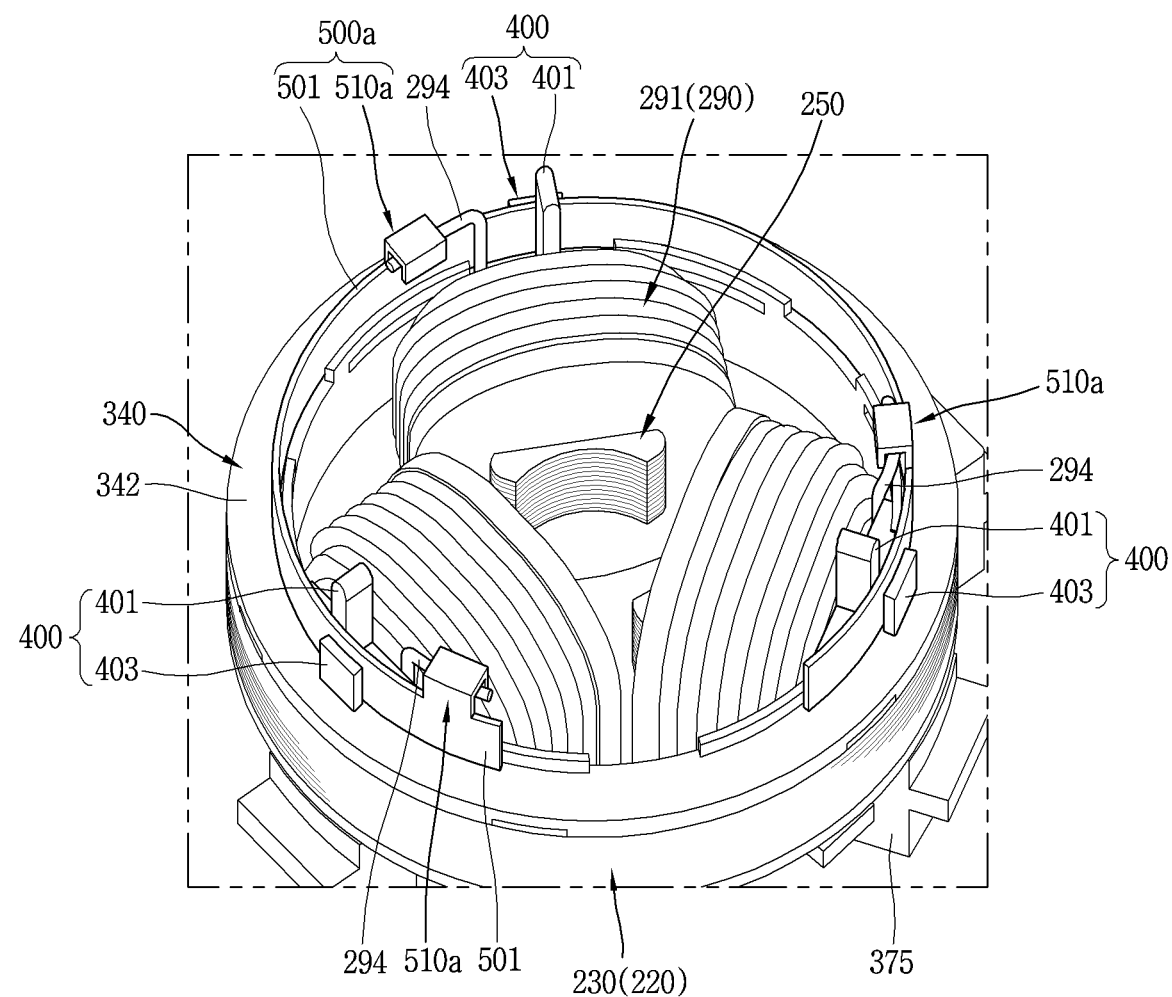
FIG. 26 is a perspective view of a state after coupling of the connection ring of FIG. 25.

FIG. 25 is a diagram for explaining a coupling state of the connection ring of FIG. 24. FIG. 26 is a perspective view of a state after coupling of the connection ring of FIG. 25. As illustrated in FIG. 25, when the connection ring 500a is to be coupled to the connection ring support portions 400, each of the neutral line connection portions 510a of the connection ring 500a is disposed at a position corresponding to a corresponding neutral line 294 along an axial direction.

Then, when the body 501 of the connection ring 500a is inserted into the connection ring support portions 400 along an axial direction, the third section 294c of each of the neutral lines 294 is accommodated in each of the neutral line connection portions 510a as illustrated in FIG. 26.

When the third section 294c of each of the neutral lines 294 is accommodated inside the neutral line connection portions 510a, the neutral lines 294 and neutral line connection portions 510a corresponding thereto may be fixed and integrally coupled to each other by soldering, etc.

The soldering portion 295 connecting the neutral lines 294 to the neutral line connection portions 510a are disposed in the neutral line connection portions 510a (FIG. 22).

So far, those specific implementations of the present disclosure have been illustrated and described. However, since the present disclosure can be embodied in various forms without departing from the essential characteristics, the implementations described above should not be limited by the specific contents for carrying out the disclosure.

In addition, even implementations not listed in the foregoing detailed description should be broadly construed within the scope of the technical idea defined in the appended claims. And, all changes and modifications included within the technical range of the claims and their equivalents should be embraced by the appended claims.

The invention claimed is:

1. A motor assembly comprising:
   a stator comprising a stator core having a plurality of teeth, a stator coil having a plurality of phase coils wound on the plurality of teeth, respectively, and an insulator interposed between the stator core and the stator coil to insulate the stator coil; and
   a rotor having a rotation shaft, spaced apart from the stator with a space therebetween, and rotatably disposed,
   wherein each of power lines of the plurality of phase coils extends to one end of the stator core along an axial direction, and each of neutral lines of the plurality of phase coils extends to another end of the stator core,
   wherein the stator further comprises a connection ring made of an electrical conductor and disposed at the another end of the stator core to simultaneously connect the neutral lines of the plurality of phase coils,
   wherein the connection ring comprises a body disposed along a circumferential direction of the stator core; and a plurality of neutral line connection portions protruding from the body and connected to the neutral lines, respectively,
   wherein the connection ring is coupled to an end of the stator such that a width of the body is disposed along the axial direction,
   wherein the stator further comprises connection ring support portions disposed in the insulator to support the connection ring,
   wherein the connection ring support portions comprise internal support portions disposed inside the body and external support portions disposed outside the body along a radial direction of the stator, and
   wherein the connection ring has an axial length less than an axial length of the internal support portions and greater than an axial length of the external support portions.

2. The motor assembly of claim 1, wherein the body has a long plate shape with a length greater than a width, and is plastically deformed to have an arcuate shape with one side open along the circumferential direction such that a thickness is disposed in the radial direction of the stator.

3. The motor assembly of claim 1, wherein the internal support portions respectively have a length corresponding to an axial length of the plurality of phase coils, and are disposed outside the plurality of phase coils, respectively.

4. The motor assembly of claim 1, wherein the external support portions have an extended length along the circumferential direction of the stator, compared to a length of the internal support portions.

5. The motor assembly of claim 1, wherein the internal support portions comprise a separation prevention projection protruding outwardly along the radial direction of the stator to be in contact with one side of the connection ring along the axial direction.

6. The motor assembly of claim 1, further comprising:
   a housing having an accommodation space disposed therein; and
   an impeller disposed on one side in the housing,
   wherein the stator is disposed on an upstream side of the impeller in the housing with reference to a flow of air moved during rotation of the impeller.

7. The motor assembly of claim 6, wherein the stator comprises a yoke having a ring shape, and
   wherein the plurality of teeth are coupled to an inner surface of the yoke along the axial direction.

8. The motor assembly of claim 7, wherein the stator further comprises, along the axial direction, power line connection portions respectively axially protruding from an opposite end of the connection ring and connected to the power lines of the plurality of phase coils, respectively.

9. The motor assembly of claim 8, wherein the insulator comprises a yoke insulator comprised in the yoke and a teeth insulator comprised in the plurality of teeth, and the power line connection portions are disposed in the teeth insulator.

10. The motor assembly of claim 8, further comprising a printed circuit board (PCB) spaced apart from an end of the housing,
    wherein the power line connection portions comprise a PCB connection terminal protruding along the axial direction to be connected to the PCB.

11. A motor assembly comprising:
    a stator comprising a stator core having a plurality of teeth, a stator coil having a plurality of phase coils wound on the plurality of teeth, respectively, and an insulator interposed between the stator core and the stator coil to insulate the stator coil; and
    a rotor having a rotation shaft, spaced apart from the stator with a space therebetween, and rotatably disposed, wherein each of power lines of the plurality of phase coils extends to one end of the stator core along an axial direction, and each of neutral lines of the plurality of phase coils extends to another end of the stator core, wherein the stator further comprises a connection ring made of an electrical conductor and disposed at the another end of the stator core to simultaneously connect the neutral lines of the plurality of phase coils, wherein the connection ring comprises a body disposed along a circumferential direction of the stator core; and a plurality of neutral line connection portions protruding from the body and connected to the neutral lines, respectively, wherein the neutral lines are disposed on an inner side with reference to an extension line axially extending from an outer diameter surface of the stator core, and wherein the plurality of neutral line connection portions are disposed on an inner side with reference to an extension line axially extending from an inner surface of the stator core, and have a groove shape open toward both sides along the circumferential direction of the stator and open outwardly along a radial direction of the stator.

12. The motor assembly of claim 11, wherein each of the plurality of neutral line connection portions axially comprises a first radial direction section protruding inwardly from one end of the body along the radial direction, an axial direction section protruding from the first radial direction section in the axial direction, and a second radial direction section protruding outwardly from the axial direction section along the radial direction.

13. A motor assembly comprising:
a stator comprising a stator core having a plurality of teeth, a stator coil having a plurality of phase coils wound on the plurality of teeth, respectively, and an insulator interposed between the stator core and the stator coil to insulate the stator coil; and
a rotor having a rotation shaft, spaced apart from the stator with a space therebetween, and rotatably disposed, wherein each of power lines of the plurality of phase coils extends to one end of the stator core along an axial direction, and each of neutral lines of the plurality of phase coils extends to another end of the stator core, wherein the stator further comprises a connection ring made of an electrical conductor and disposed at the another end of the stator core to simultaneously connect the neutral lines of the plurality of phase coils, wherein the connection ring comprises a body disposed along a circumferential direction of the stator core; and a plurality of neutral line connection portions protruding from the body and connected to the neutral lines, respectively, wherein the neutral lines are disposed on an inner side with reference to an extension line axially extending from an outer diameter surface of the stator core, and wherein the plurality of neutral line connection portions are disposed on an inner side with reference to an extension line axially extending from an inner surface of the stator core, and have a groove shape open toward both sides along the circumferential direction of the stator and open toward the stator core along the axial direction.

14. The motor assembly of claim 13, wherein each of the plurality of neutral line connection portions axially comprises a first axial direction section protruding from one end of the body in the axial direction, a radial direction section protruding from the first axial direction section along a radial direction, and a second axial direction section protruding from the radial direction section in the axial direction.

* * * * *